US006574569B1

(12) United States Patent
Omata et al.

(10) Patent No.: US 6,574,569 B1

(45) Date of Patent: Jun. 3, 2003

(54) PAPER QUALITY DETERMINATION SENSOR AND FAULTY BANKNOTE SORTING DEVICE

(75) Inventors: Nobuaki Omata, Kyoto (JP); Masanobu Segawa, Kyoto (JP); Atsushi Irie, Kyoto (JP); Atsushi Osada, Ibaraki (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/646,772

(22) PCT Filed: Mar. 26, 1999

(86) PCT No.: PCT/JP99/01570

§ 371 (c)(1), (2), (4) Date: Jan. 22, 2001

(87) PCT Pub. No.: WO99/50797

PCT Pub. Date: Oct. 7, 1999

(30) Foreign Application Priority Data

Mar. 27, 1998 (JP) .......................................... 10-100056

(51) Int. Cl.$^{7}$ .......................... G01L 5/04; B23B 31/00; G01B 3/00

(52) U.S. Cl. ............................ 702/33; 73/159; 73/587; 156/64; 257/292; 271/10.03; 271/115; 400/248

(58) Field of Search ..................... 702/33, 95; 194/206; 324/676; 271/115, 10.03, 117, 177; 73/159, 587; 400/59, 248; 257/292; 156/64

(56) References Cited

U.S. PATENT DOCUMENTS

| | | | | |
|---|---|---|---|---|
| 4,463,607 A | * | 8/1984 | Hilton | 73/587 |
| 4,864,851 A | * | 9/1989 | Haughton | 73/159 |
| 4,929,102 A | * | 5/1990 | Mizutani et al. | 400/248 |
| 5,927,703 A | * | 7/1999 | Endo | 271/10.03 |
| 6,224,051 B1 | * | 5/2001 | Nakayama et al. | 271/115 |
| 6,344,670 B2 | * | 2/2002 | Yamaguchi | 257/292 |
| 6,409,857 B2 | * | 6/2002 | Pallas et al. | 156/64 |

FOREIGN PATENT DOCUMENTS

| | | |
|---|---|---|
| JP | 52-58998 | 5/1977 |
| JP | 62-206435 | 9/1987 |
| JP | 63-247895 | 10/1988 |
| JP | 9-301583 | 11/1997 |
| JP | 10-213581 | 8/1998 |

* cited by examiner

*Primary Examiner*—John Barlow
*Assistant Examiner*—John Le
(74) *Attorney, Agent, or Firm*—Dickstein Shapiro Morin & Oshinsky LLP

(57) ABSTRACT

A paper quality determining sensor and a faulty paper sorting device capable of detecting reaction forces of paper sheets themselves which vary according to paper quality using a plurality of rollers so as to detect the stiffness (rigidity) of paper sheets accurately without being affected by thicknesses of the paper sheets.

10 Claims, 20 Drawing Sheets

PAPER QUALITY DETERMINATION SENSOR AND FAULTY BANKNOTE SORTING DEVICE

TECHNICAL FIELD

The present invention relates to a paper quality determination sensor for determining quality of paper sheets such as banknotes as paper money which are deposited into or drawn from, for example, an automatic teller machine (ATM), and more particularly to a paper quality determination sensor for accurately detecting the quality and condition of paper sheets without being affected by the thickness thereof and a faulty banknote sorting device.

BACKGROUND ART

As a paper sheet of the kind described above, banknotes which are paper money, are taken as an example for explanation. Banknotes tend to be broken and become dirty while they are circulated for a long time, or banknotes tend to become soft gradually even if they are not damaged externally. In the event that supple (unrigid), deformed or broken banknotes are used in automatic teller machines or the like which are identified as improper for circulation, the banknotes may get stuck (or jammed) inside the machine.

To cope with this, there is known a paper quality determination device for determining, so to speak, indirectly whether banknotes deposited into the automatic teller machine are proper or improper for use or circulation, by optically detecting missing portions or the degree of dirtiness of banknotes so deposited or analyzing the frequency of feeding noise generated when the banknotes are deposited, or an improper or faulty banknote sorting device with such a paper quality determination device.

With an indirect detecting system as described above, however, since the system is constructed so as to detect the degree of faultiness of banknotes without contacting them, the indirect detecting system cannot specify the stiffness of banknotes in circulation which causes the jamming, and this increases the detection error and hence deteriorates the reliability of the system.

Additionally, the indirect detecting system cannot detect the deformation and breakage of paper sheets which are objects to be inspected.

To cope with this, there have been proposed a so-called direct-type determination device for directly detecting the stiffness of circulating banknotes. For example, JP-A-09-040216, JP-A-10-111968 and JP-A-10-213581 are known.

One example of the direct-type detecting devices as disclosed in those publications will be described with reference to FIGS. 8 and 9.

This prior art device comprises a pick-up roller 94 for initial feeding provided so as to confront the feeding surface of a banknote 93 that is to be fed from a stacker 92, a feed roller 95, a gate roller 96 and a feed detecting sensor 97, the feed roller 95, the gate roller 96 and the feed detecting sensor 97 being disposed at a feeding portion of the device, and thereby operates for feeding banknotes 93 contained in the stacker 92.

In this construction, the tilting condition of a tilting lever 98 which is integral with the gate roller 96 and adapted to variably tilt in response to the stiffness of the fed banknotes 93 so as to allow the passage thereof to be detected with a strain gauge detection sensor 99 to thereby determine the stiffness of the banknotes 93 so fed, whereby they are determined as proper or faulty for circulation.

With the direct-type detecting device described above, however, since the construction is such that the strain gauge detection sensor is combined with the gate roller which is regulated with respect to the rotation thereof, the rush-in resistance and feed resistance of banknotes are increased, and detection values of the device are largely changed by the thickness of banknotes, this causing a problem that with banknotes of a specific country which are supple for the thickness thereof, it is difficult to determine whether banknotes are proper or improper.

The present invention was made in view of these situations, and an object thereof is to realize by paying attention to the paper quality reaction force inherent in paper sheets, a paper quality determination sensor for accurately detecting the stiffness (rigidity) of papersheets and further the thickness and deformation and breakage thereof without being affected by the thickness and/or deformation of paper sheets, and a faulty banknotes sorting device/paper quality measuring device.

DISCLOSURE OF THE INVENTION

The present invention is provided with a biasing means for applying a biasing force to a paper sheet which is an object to be detected so as to detect a reaction force that the paper sheet generates when resisting against the biasing means.

The biasing means is, for example, a sensor lever for supporting a sensor roller, and it is designed so that a biasing force is applied to a paper sheet by virtue of the elasticity inherent in the sensor lever itself. A reaction force generated from a paper sheet can be measured by providing on the sensor lever a detection sensor for detecting the traveling amount of the sensor lever. The condition of paper sheets can easily be determined from the magnitude of the reaction force, a change therein with time, and the amplitude thereof, or the like.

BRIEF DESCRIPTION OF THE DRAWINGS

FIG. 18 is a flowchart showing an abnormality determination process using feature values h, t, a.

BEST MODE FOR CARRYING OUT THE INVENTION (First Embodiment)

A first embodiment of the present invention will be described below with reference to the drawings.

Figure 1:
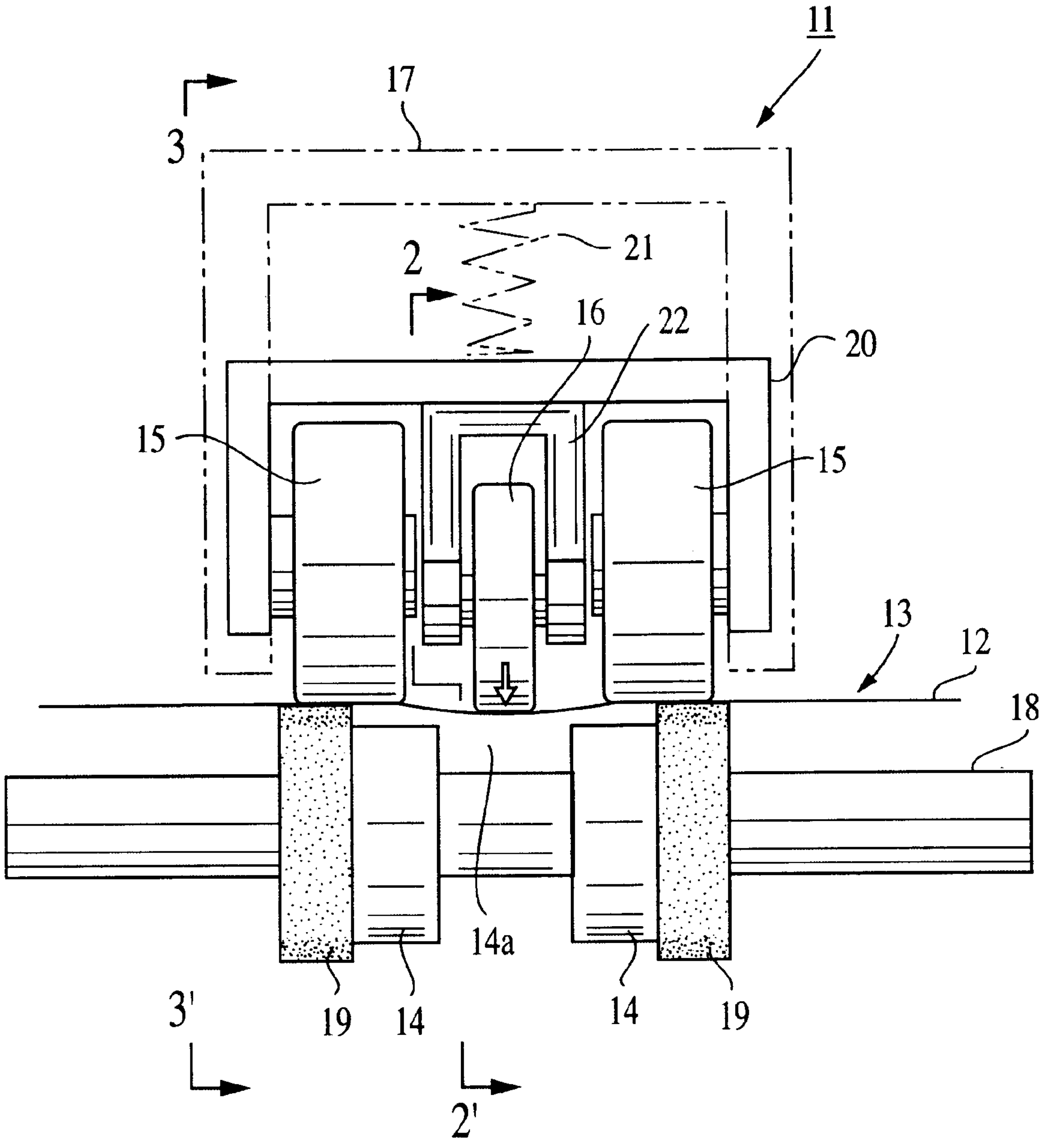
FIG. 1 is a front view showing a main part of a paper quality determination sensor according to the present invention.
Figure 2:
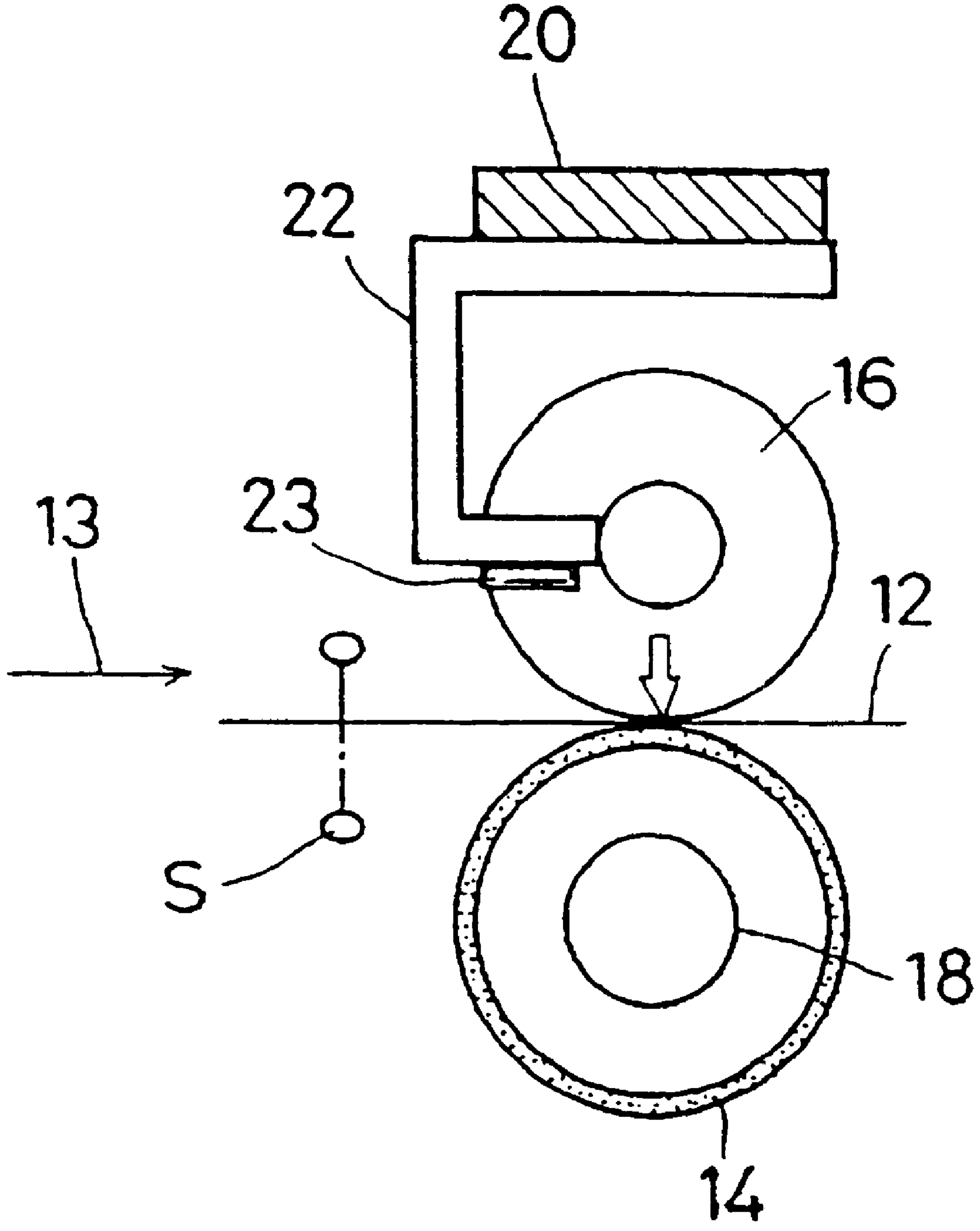
FIG. 2 is a side view taken along the line of 2–2' of FIG. 1 in accordance with the present invention.
Figure 3:
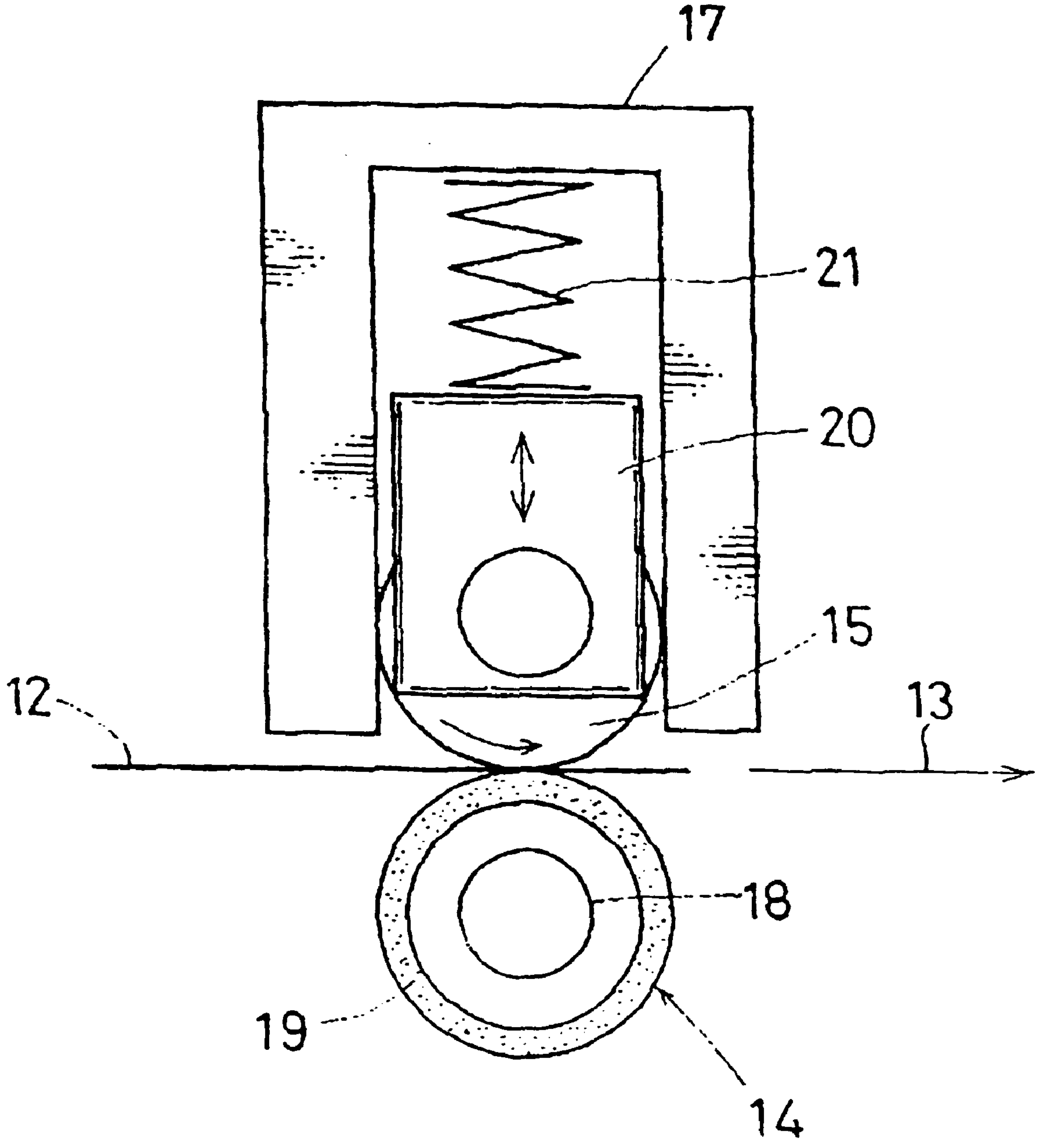
FIG. 3 is a side view taken along the line of 3–3' of FIG. 1 in accordance with the present invention.

FIGS. 1 to 3 show a paper quality determination unit 11 for banknotes. This unit 11 has reference rollers 14 disposed on one side (a lower side as viewed in the figures) of a hold carrying path 13 for banknotes 12 as paper sheets and carrying rollers 15 and a sensor roller 16 which are disposed on the other side (an upper side) of the carrying path 13 in such a manner as to face the reference rollers 14.

The reference rollers 14 are attached as a pair of left and right rollers on a stationary shaft 18 supported horizontally on a unit frame 17 in such a manner that the rotation thereof is regulated, and a recessed portion 14*a* as viewed from the front is formed between the reference rollers 14. Additionally, rubber rollers 19 are provided axially outwardly of the respective reference rollers 14.

The carrying rollers 15 are rotatably supported on a carrying roller holder 20 and are disposed so as to face the pair of reference rollers 14, respectively.

Then, the carrying roller holder 20 is mounted within the unit frame 17 in such a manner as to be biased toward the pair of reference rollers 14 with a pressing spring 21.

Thus, the carrying roller holder 20 and the carrying rollers 15 are press biased to the reference rollers 14 side with the unit frame 17 acting as a fixed reference, so that a banknote 12 that is to be introduced therebetween can be carried while being held.

The sensor roller 16 is rotatably supported on one end of a sensor lever 22, which is fixed to the carrying roller holder 20 at a proximal end thereof. As a result, therefore, similar to the carrying rollers 15, the sensor roller 16 is also biased toward the reference rollers 14 with the pressing spring 21.

However, while the rotating shaft of the carrying rollers 15 is fixed to the carrying roller holder 20, the sensor roller 16 is mounted in such a manner as to protrude further toward the reference rollers 14 than the carrying rollers 15, and therefore, the sensor lever 22 to which the sensor roller 16 is attached is, as shown in FIG. 2, biased toward the reference rollers 14 by virtue of an elasticity of the sensor lever 22 itself. In other words, the carrying rollers 15 are biased toward the reference rollers 14 by virtue of the pressing force of the pressing spring 21, and with this biasing force the banknote 12 is held therebetween at a certain tensile force being maintained thereon.

On the other hand, the sensor roller 16 is constructed so as to protrude into the opening of the recessed portion 14*a* in a state in which the sensor roller 16 is biased against the surface of the banknote 12 to which the certain tensile force is being applied by virtue of the elasticity of the sensor lever 22.

A strain gauge 23 is mounted on the sensor lever 22, and when the sensor roller 16 receives a reaction force against the tensile force of the banknote 12 which passes through the hold carrying path 13, a certain strain is generated in the sensor lever 22, whereby the strain so generated is then detected by the strain gauge 23. Thus, the rigidity of the banknote can be measured by detecting the amount of strain so generated.

This strain gauge 23 is designed to utilize a characteristic that the electric resistance varies due to the strain of an object, and a difference between the resistance values can be converted into a difference in voltage by configuring a bridge circuit. In the construction of this embodiment, since the sensor roller 16 is attached to the carrying roller holder 20 via the sensor lever 22, the deflection amount of the sensor lever 22 by the sensor roller 16 can be detected with the surface of the banknote 12 as a reference, and therefore even if there is a difference in thickness of paper sheets, outputs can be obtained in response to the rigidity of banknotes 12.

Figure 4:
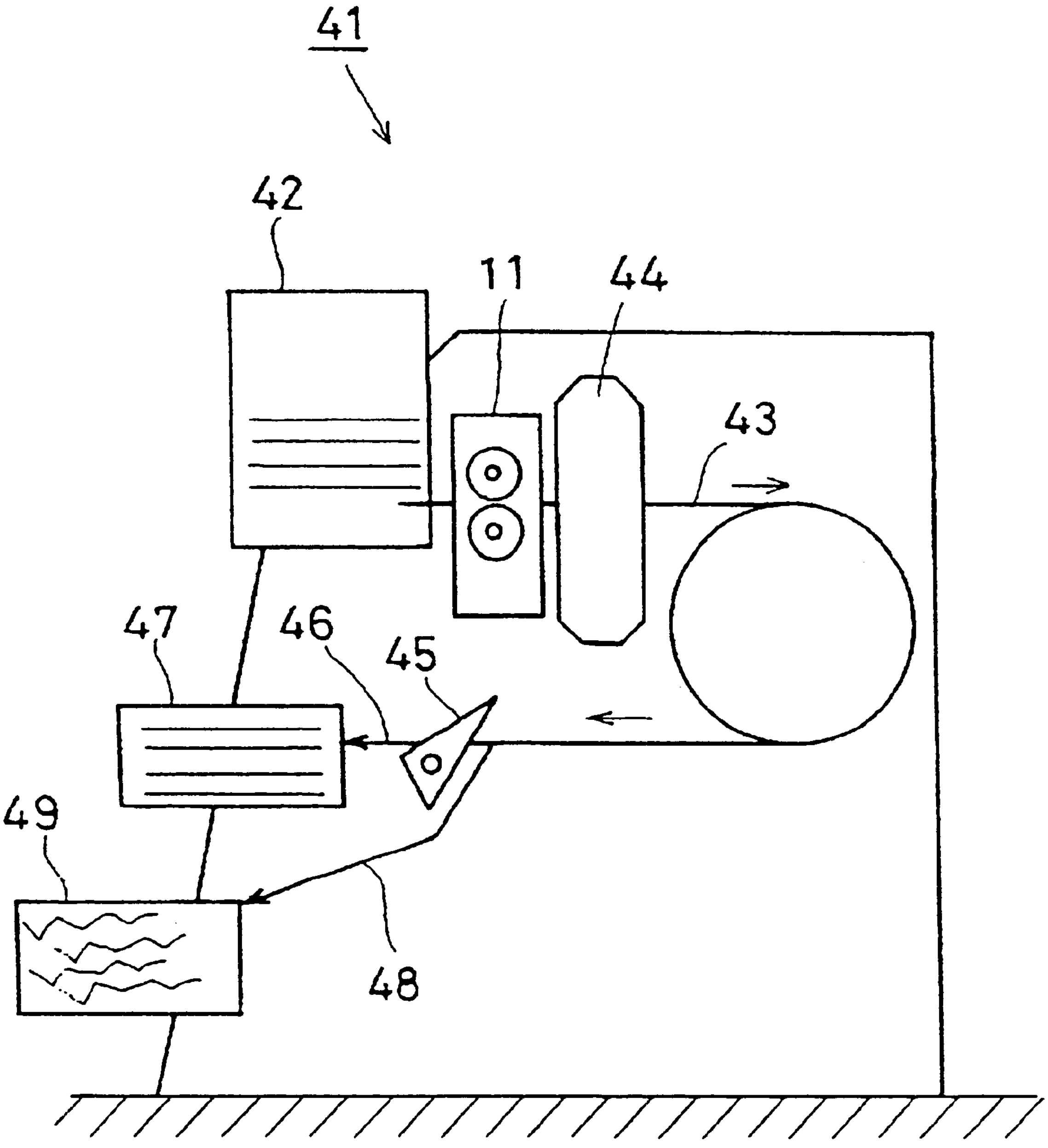
FIG. 4 is a schematic view showing the structure of a banknote sorting in an ATM of the present invention.

FIG. 4 shows an example in which the paper quality determination unit 11 is incorporated in an automatic teller machine or ATM 41.

The paper quality determination unit 11 and an identification unit 44 are disposed along a deposit passage 43 communicating with a deposit port 42. A proper banknote stacker 47 and a faulty banknote box 49 are disposed downstream of the deposit passage 43 in such a manner that the proper banknote stacker 47 is connected to the deposit passage 43 via a proper banknote carrying path 46 for carrying proper banknotes sorted by a sorting portion 45 for carriage. The faulty banknote box 49 is connected to the deposit passage 43 via a faulty banknote carrying path 48 for carrying faulty banknotes. The proper banknote carrying path 46 and the faulty banknote carrying path 48 being branched off the deposit passage 43 by the sorting portion 45.

A banknote 12 deposited through the deposit port 42 is determined with respect to the stiffness by the paper quality determination unit 11 and is then identified with respect to the kind of the banknote 12 and the degree of dirtiness thereof by the identification unit 44. When the banknote 12 is determined as a proper banknote, the banknote 12 is introduced into the proper banknote stacker 47 such as stackers prepared for respective kinds of banknotes and received therein for processing.

In contrast to this, in the event that the banknote so deposited is determined as a supple banknote which is improper for circulation by the paper quality determining unit or that it is identified as a defect banknote by the identification unit, the banknote is then received in the faulty banknote box 49 such as a reject box as a faulty banknote for storing and processing.

Figure 5:
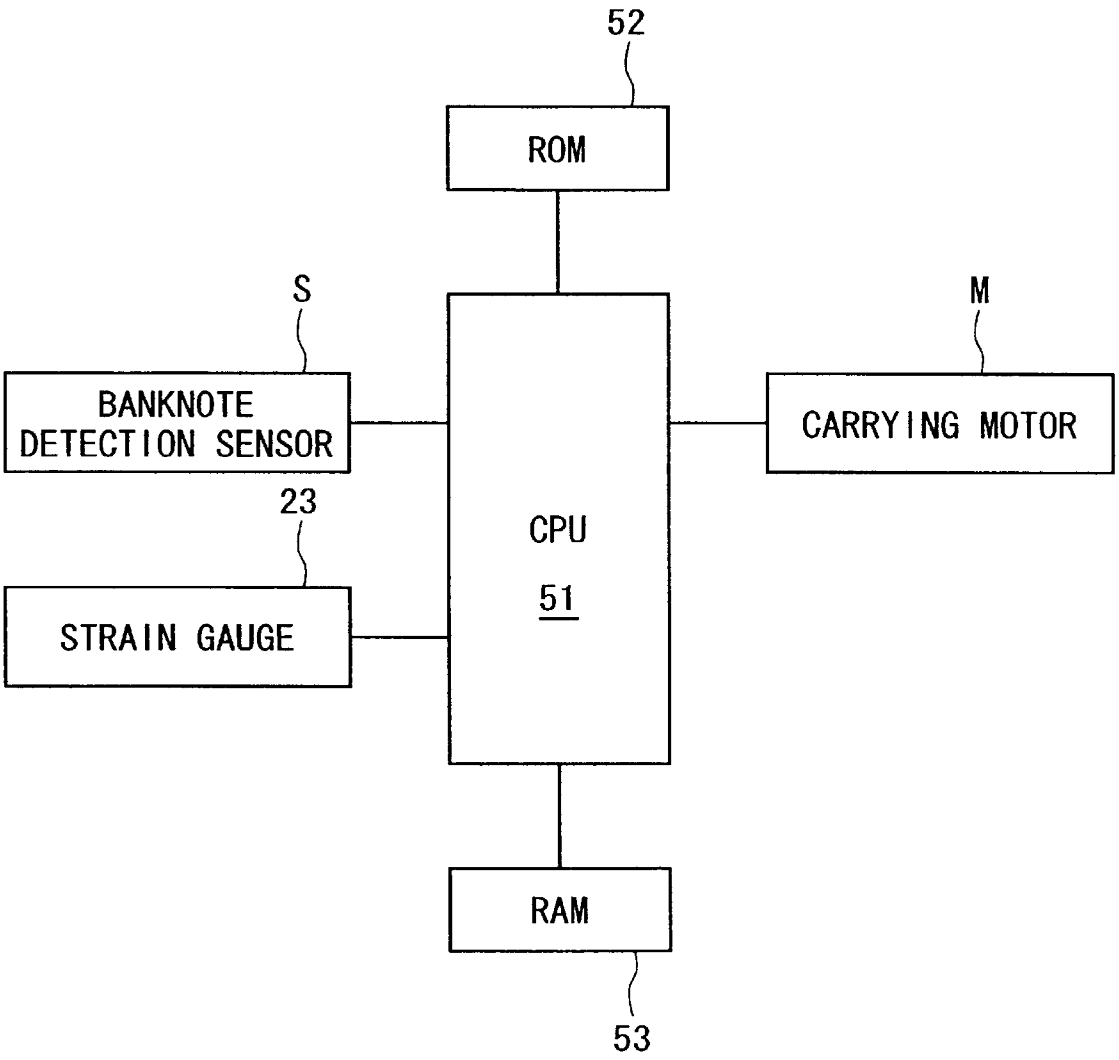
FIG. 5 is a block diagram for a control circuit for the paper quality determination sensor according to the present invention.

FIG. 5 is a block diagram showing a control circuit of the paper quality determination unit 11 according to the present embodiment, and a CPU 51 is a small computer system comprising memories (ROM 52, RAM 53) and interfaces (not shown). The CPU 51 is constructed so as to read values A/D converted from detection signals from a banknote detection sensor S (not shown in FIG. 4) within the identification unit 44 and the strain gauge 23 based on programs stored in the ROM 52 for comparison with threshold values stored in the RAM 53 to determine whether the bank note in question is a proper banknote or a faulty banknote.

Additionally, the CPU 51 controls a carrying motor M so as to drive the reference rollers 14 to thereby move a banknote on the carrying passage 13 in a specific direction.

In the event that the detection waveform of a proper banknote is obtained as the result of a measurement by the strain gauge, since the deformed reaction force of the banknote 12 is large, the deformation amount of the sensor lever 22 becomes large in proportion to the reaction force, and as a result, the output voltage from the strain gauge 23 integral with the sensor lever 22 also becomes high.

On the contrary, in the case of the detection waveform B of a faulty banknote, since the stiffness of the banknote 12 is low, the deformed reaction force thereof is small, and in conjunction with this, the deformed amount of the sensor lever 22 is outputted small, whereby the output voltage from the strain gauge 23 integral with the sensor lever 22 is outputted as low. Therefore, since the results of the measurement of the proper banknote and that of the faulty banknote are clearly different, the proper banknote and faulty banknote are clearly discriminated from each other for detection.

FIGS. 10 to 14 compare waveforms outputted from strain gauge 23 of a proper banknote and faulty banknotes which are, respectively, deformed, broken and partially lost during circulation.

Figure 10:
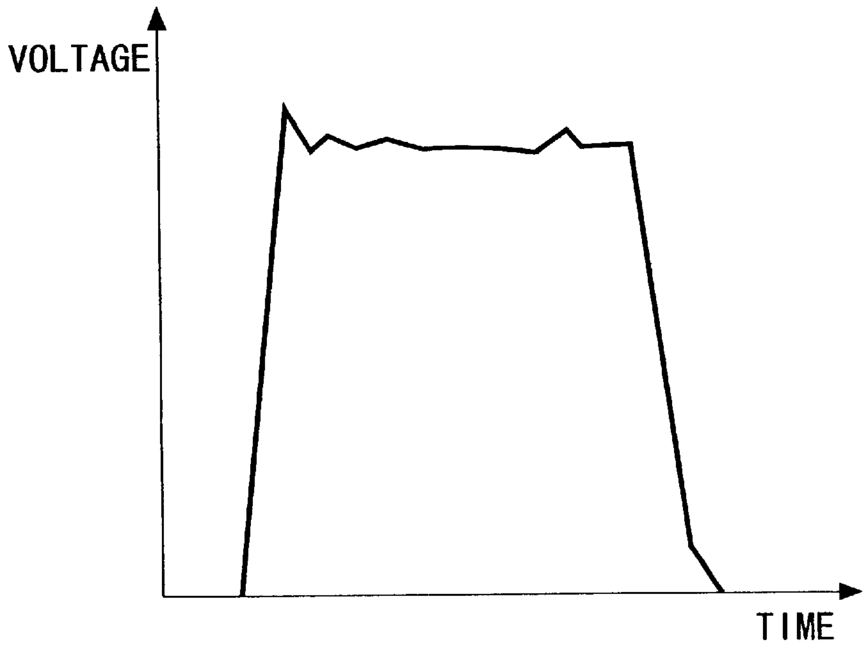
FIG. 10 is a graph showing an output voltage waveform (of a proper banknote) from the strain gauge.
Figure 11:
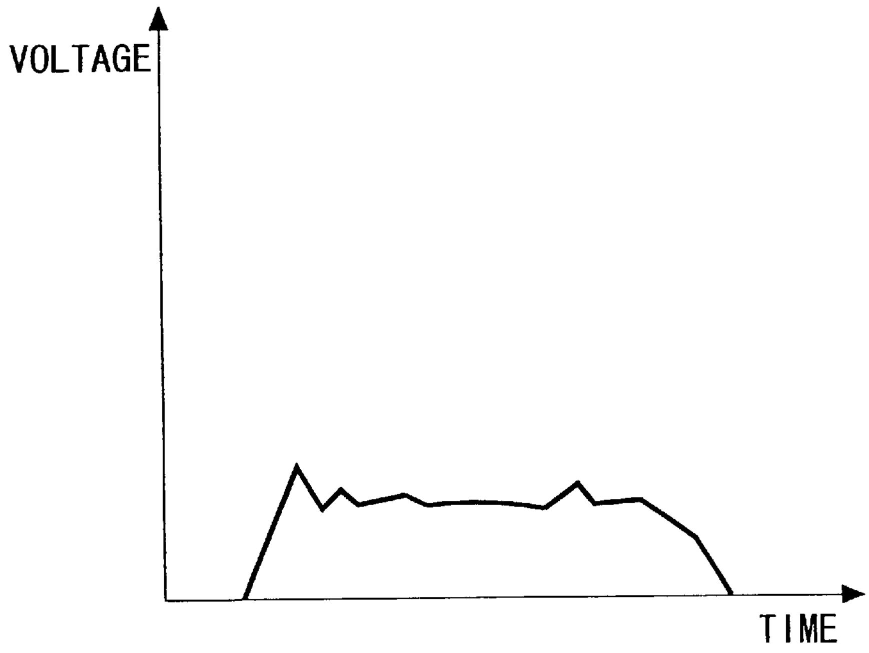
FIG. 11 is a graph showing an output voltage waveform (of a supple banknote) from the strain gauge.

FIG. 10 shows a waveform outputted from the strain gauge 23 of the proper banknote, in which the axis of ordinate represents output voltage and the axis of abscissa represents time. In contrast to this, with a supple banknote, a reaction force obtained is small and the value of output voltage from the strain gauge 23 is also small, resulting in a flat waveform (FIG. 11).

Figure 12:
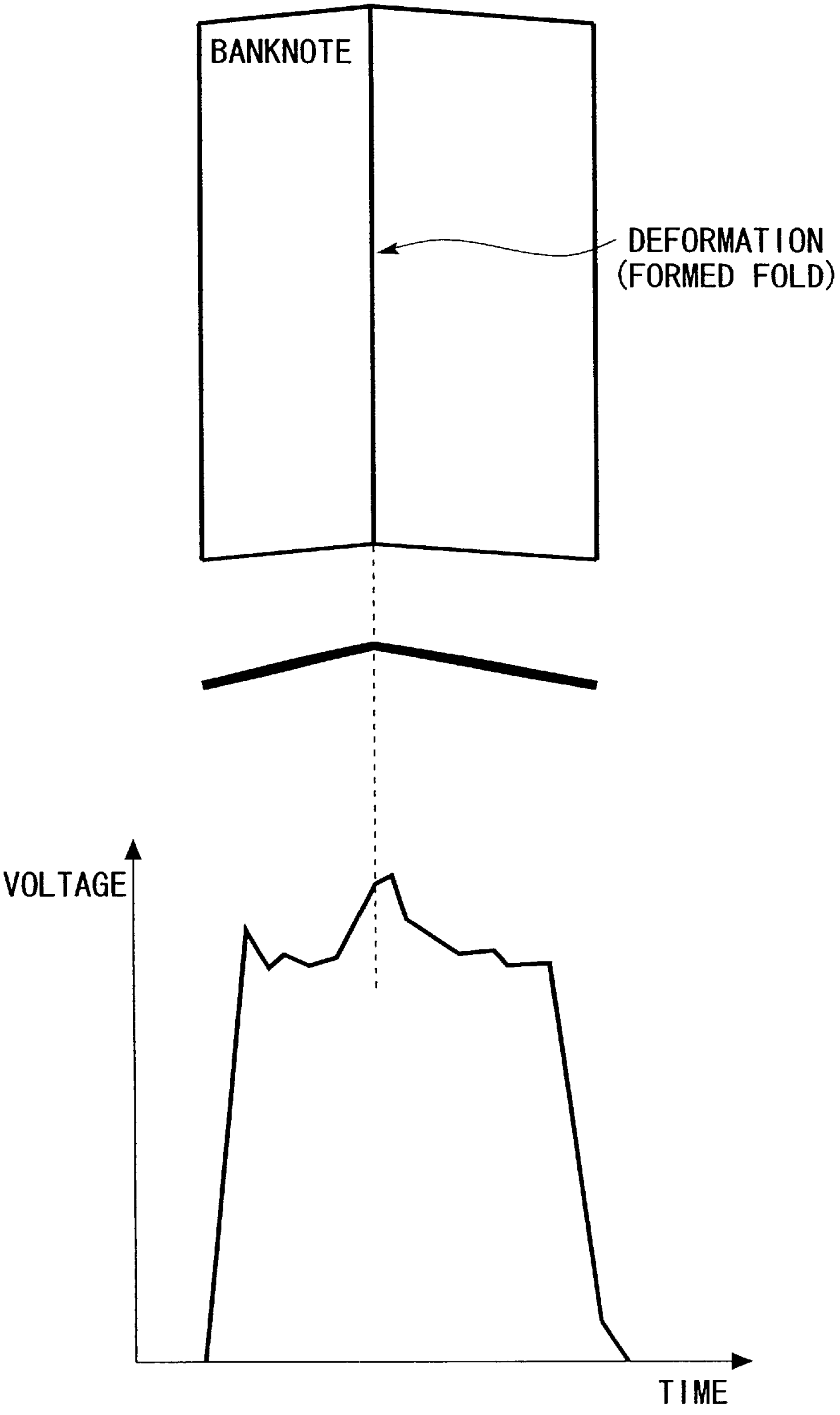
FIG. 12 is a graph showing an output voltage waveform of a deformed banknote from the strain gauge.

Additionally, in the case of a deformed banknote in which a fold line is formed (in the figure, the banknote is folded angularly relative to the sensor roller 16), since the stiffness at the deformed portion is being stronger that the other portions of the banknote, and therefore, as shown in FIG. 12, a waveform obtained is characterized in that a portion thereof corresponding to the folded portion sharply erects. It is possible to detect a deformation such as this in which a fold line is formed in the deformed banknote 12 by determining a maximum peak portion of the voltage waveform.

Figure 13:
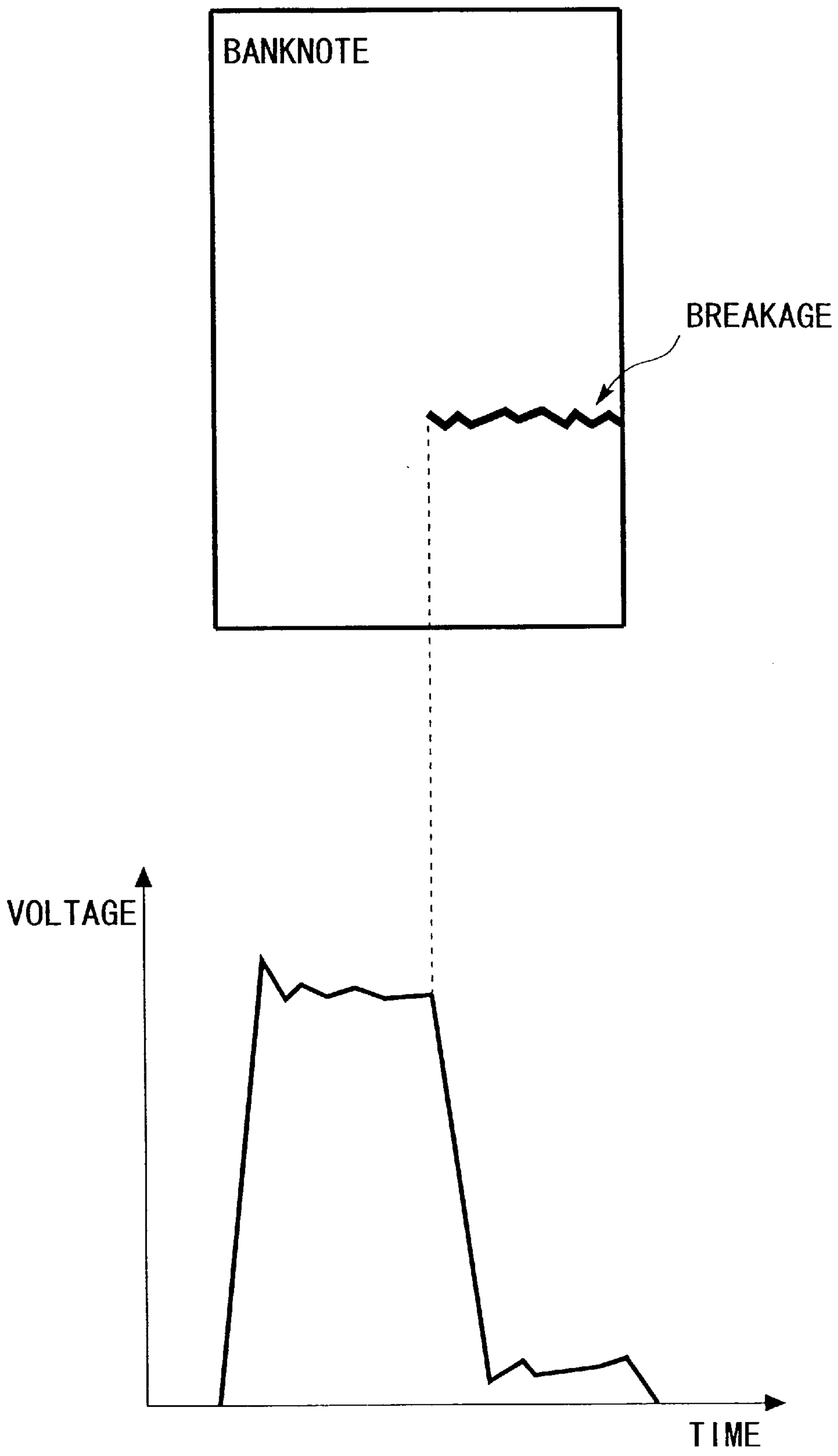
FIG. 13 is a graph showing an output voltage waveform of a damaged banknote from the strain gauge.
Figure 14:
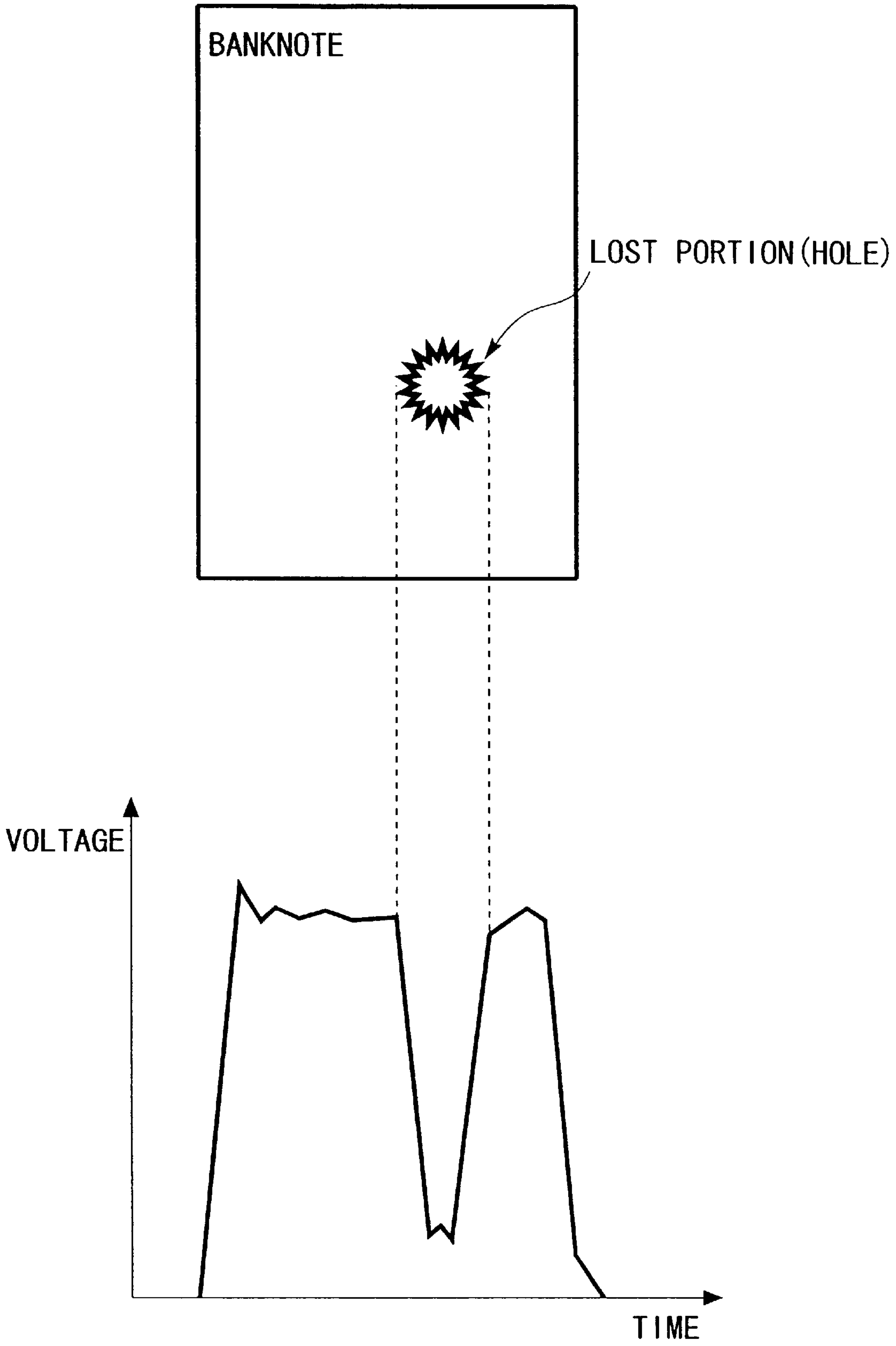
FIG. 14 is a graph showing an output voltage waveform of a banknote having a missing portion from the strain gauge.

FIG. 13 shows a waveform characteristic in which a banknote is broken. Since there is caused no or very little reaction force at a broken portion of the banknote, the output voltage drastically drops. Additionally, in the case of a banknote whose surface is partially lost, a waveform characteristic results in which the output voltage corresponding to the lost portion drops. Thus, it is also possible to detect a broken or partially lost banknote 12 by determining a voltage change with time like this.

Next, concretely described referring to FIGS. 15 to 18 will be an algorithm for determining whether a banknote is proper or faulty.

Figure 15:
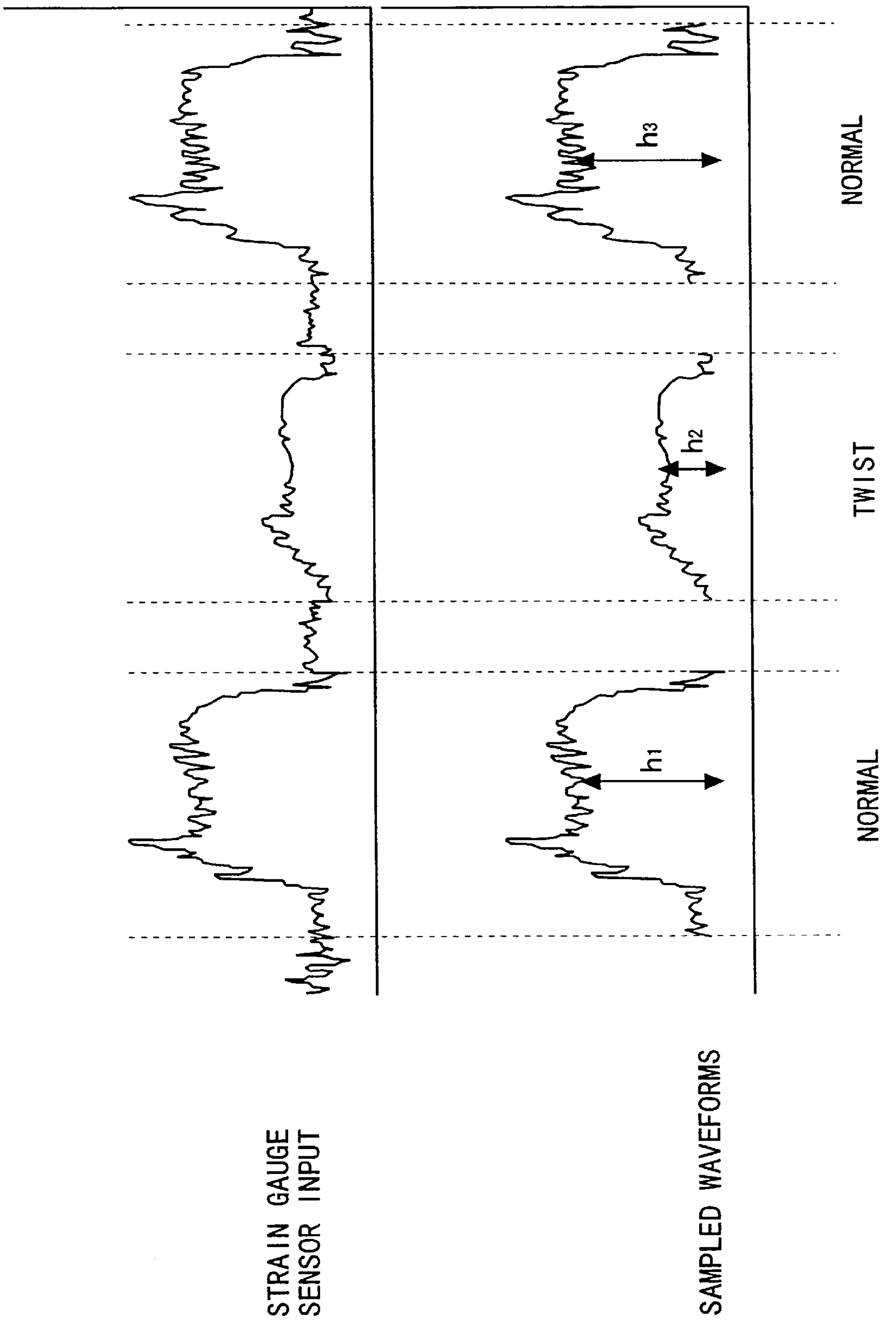
FIG. 15 is a graph showing an effective value h of an output voltage from the strain gauge.

A waveform shown at an upper portion of FIG. 15 is a waveform outputted from the strain gauge 23, while a waveform shown at a lower portion of the same figure is a waveform (a waveform needed for processing for determination) taken out at the time of passing of a banknote. The figure shows the results of detections of characteristic amounts h, which were carried out substantially at a central portion of a banknote 12 passing through the carrying path 13, whereby effective values h1, h2, h3 were obtained, respectively, for a new banknote, a banknote in circulation and a new banknote 12 which were fed in that order.

Figure 16:
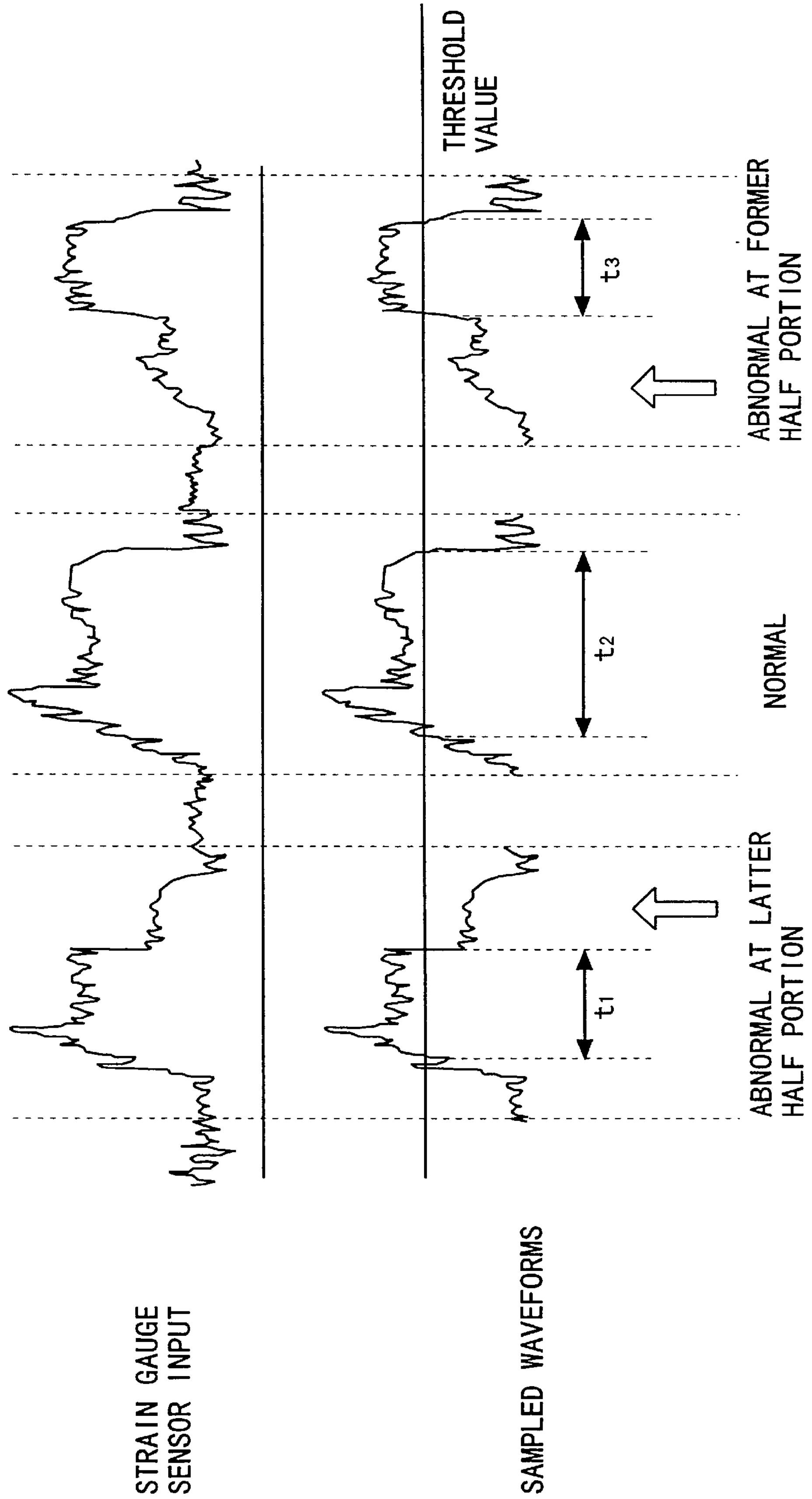
FIG. 16 is a graph showing the number of times (time) t that the output voltage from the strain gauge exceeds a threshold value.

FIG. 16 shows the results of detections of the number of times or time that threshold voltages stored in advance in the RAM 53 are exceeded, which detections were made on banknotes 12 such as a new banknote, a banknote in circulation and a new banknote which were fed in that order similarly to the previous detection of the characteristic amounts. Thus, the number of times of exceeding the threshold values (time) t1, t2, t3 were obtained.

Figure 17:
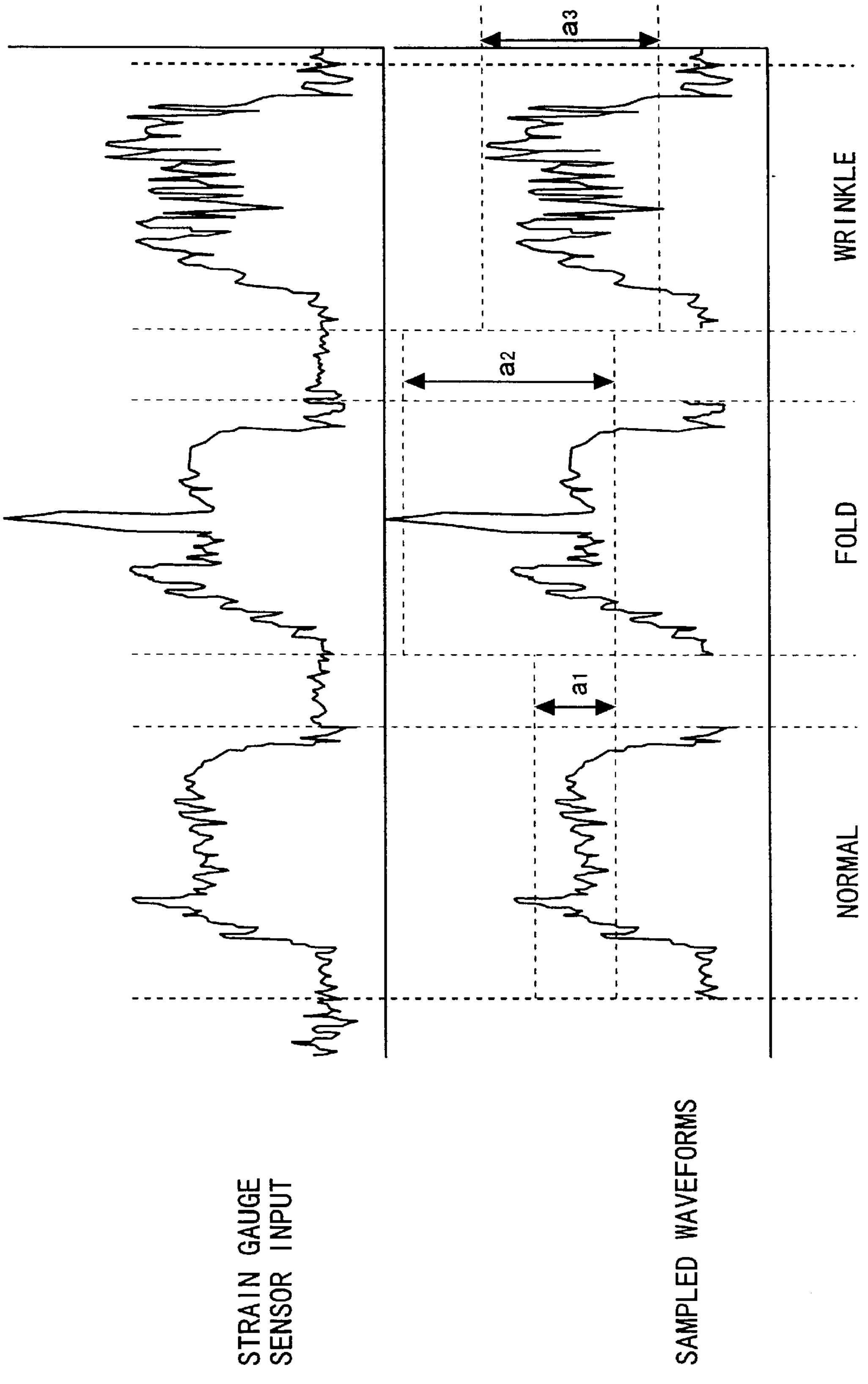
FIG. 17 is a graph showing an amplitude value a of the output voltage from the strain gauge.

FIG. 17 shows the results of detections of change in voltage amplitude which were made on banknotes 12 such as a new banknote, a banknote in circulation and a new banknote which were fed in that order, and amplitude values a1, a2, a3 were obtained.

Figure 18:
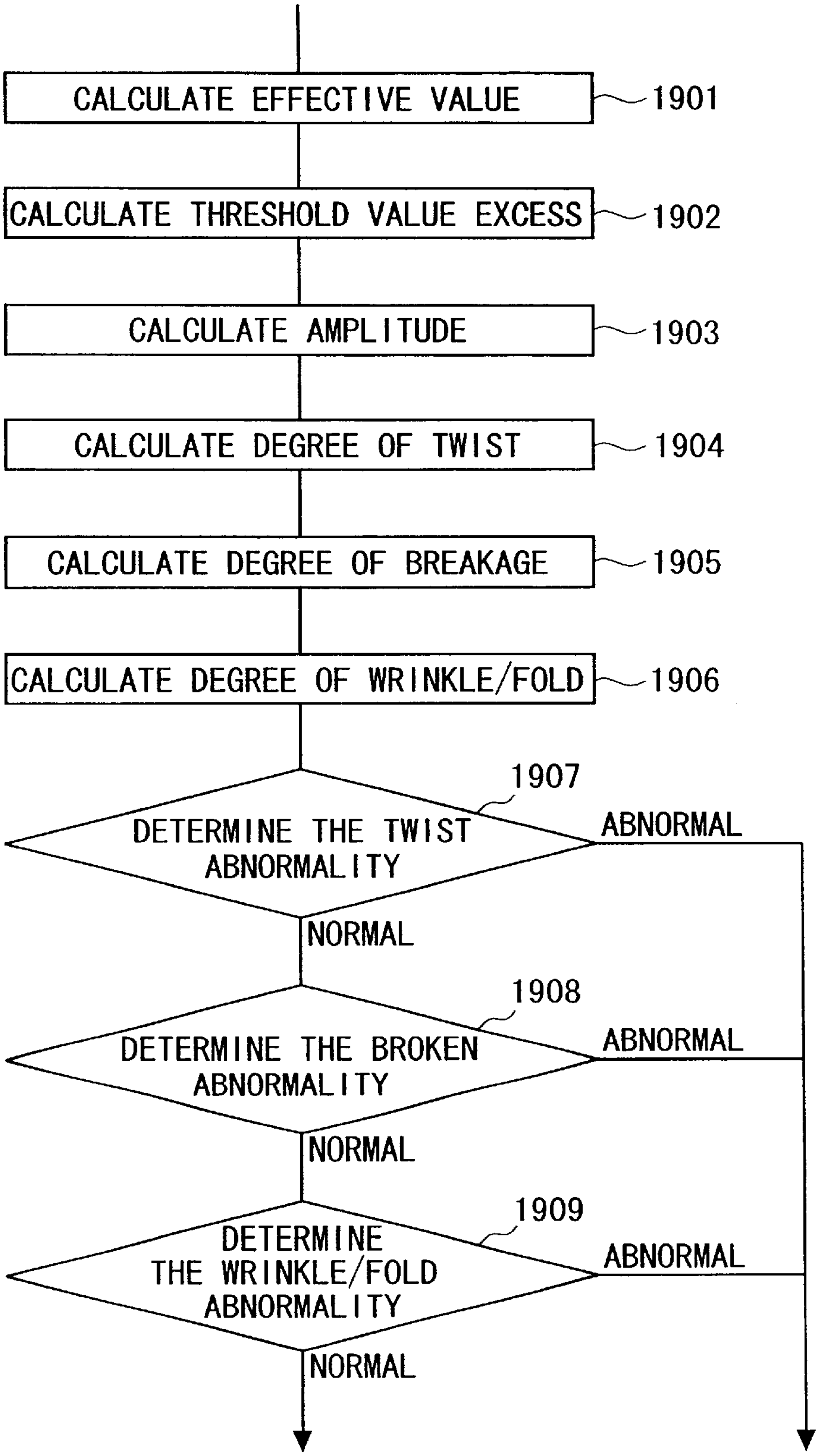

FIG. 18 is a flowchart of an abnormality determination process using the characteristic values h, t, a.

In this flowchart, first the effective value h, the number of times of exceeding the threshold values (time) t and the amplitude a are detected in that order (Steps 1901 to 1903), and the degrees of twist, breakage and wrinkle/fold of a banknote 12 are respectively calculated from the detected values h, t and a through calculating processes.

Calculations for the respective degrees will be performed as below.

First, the abnormality in degree of the respective characteristics is calculated from the characteristic values obtained in Steps 1901 to 1903.

Here, the following calculation will be performed to obtain the abnormality in degrees of the respective characteristics.

Lets set the respective characteristic values as c (the h, t, a), upper limit values for the respective characteristic values as CH and lower limit values for the same as CL.

Here, assuming that outputted values for the respective degrees range from 0 to R, an abnormality degree value can be obtained by the following arithmetic expression:

$$D=(c-CL)\cdot R/(CH-CL)$$

The determination of abnormality is carried out by comparing abnormality degree values so obtained with threshold values G set by the user. In other words, in determining the degree of twist, when Dh<Gh, the banknote is determined as abnormal. Namely, as shown in FIG. 15, the banknote is determined as abnormal when the effective value h is small.

In determining the degree of breakage, the banknote is determined as abnormal when Dt<Gt. Namely, as is seen from FIG. 16, the banknote is determined as abnormal when the number of times that the threshold value is exceeded (time) t is small (short).

In determining the degree of wrinkle/fold, the banknote is determined as abnormal when Da>Ga. In other words, as is seen from FIG. 17, the banknote is determined as abnormal when the amplitude a is larger.

Figure 6:
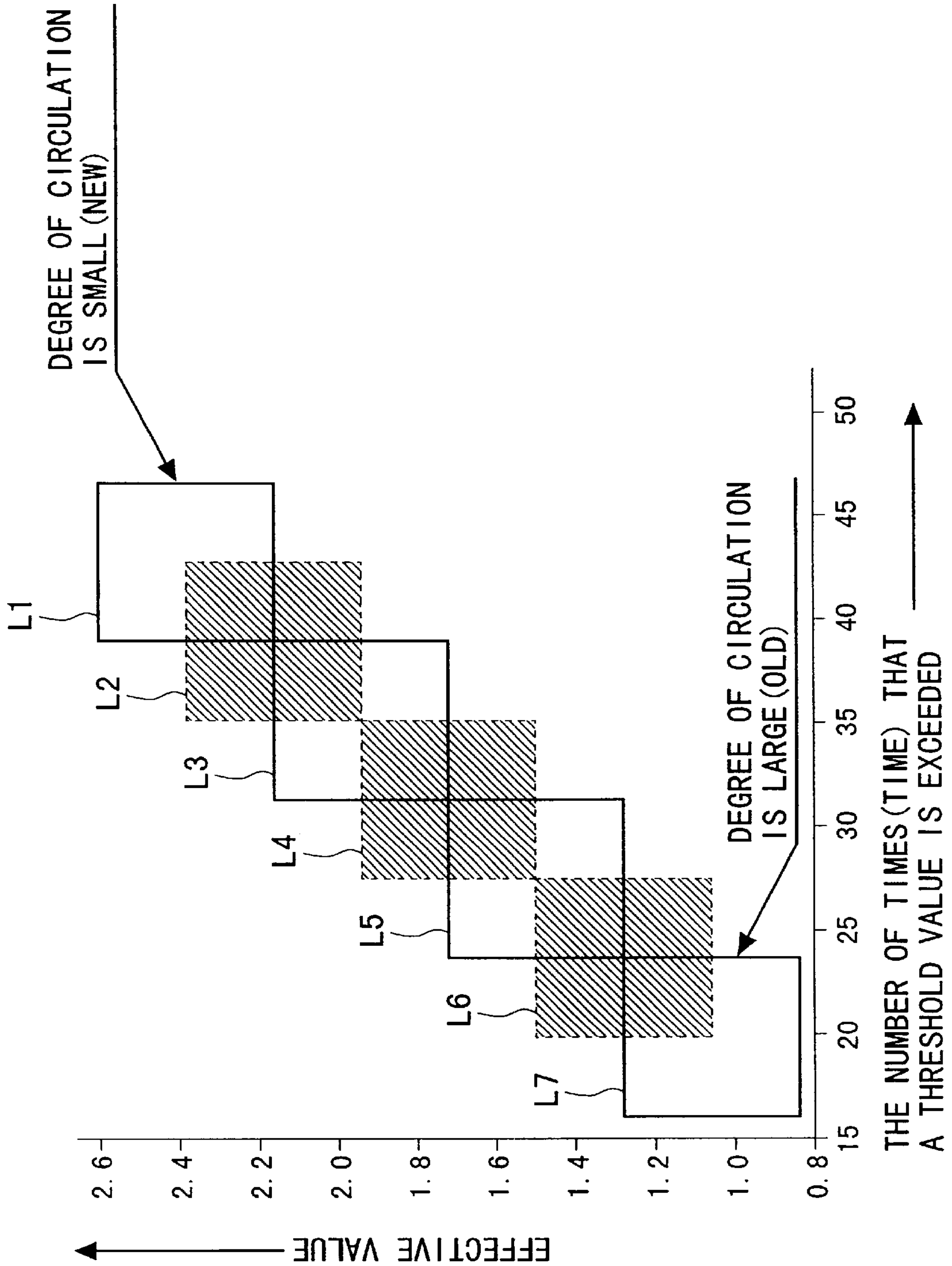
FIG. 6 is a chart showing the level of a faulty banknote with an effective value and a maximum value.

A concrete determination on whether or not a banknote is abnormal can be performed by determining coordinate values as shown in FIG. 6. Namely, in a graph shown therein, the effective value h, which is one of the characteristic values, is shown along the axis of ordinate, and the number of times (time) t that the threshold value is exceeded, which is another one of the characteristic values, is shown along the axis of abscissa. The determination on whether the banknote is a proper banknote or a faulty one is performed by applying the degrees of circulation (here, L1 to L7) in a step-like fashion depending on in which areas the respective degrees calculated in Steps 1904 to 1906 fall. The boarder lines for the degrees for the faulty banknote can be set for different kinds of banknotes or countries where banknotes 12 in question are issued.

Note that in determination of the degrees of abnormal conditions as described above, a fuzzy logic and a genetic engineering algorithm may be used.

In the event that the degree of circulation is determined as equal to or less than a certain value for all the respective characteristic values (h, t, a) as described above, the CPU 51 determines that the banknote in question is proper and activates the sorting portion 45 so as to allow the banknote in question to be received in the proper banknote stacker 47.

On the other hand, in the event that the CPU 51 determines that the banknote is abnormal in any one of the determination steps (1907 to 1909), the CPU 51 allows the banknote in question to be received in the faulty banknote box 49.

Figure 7:
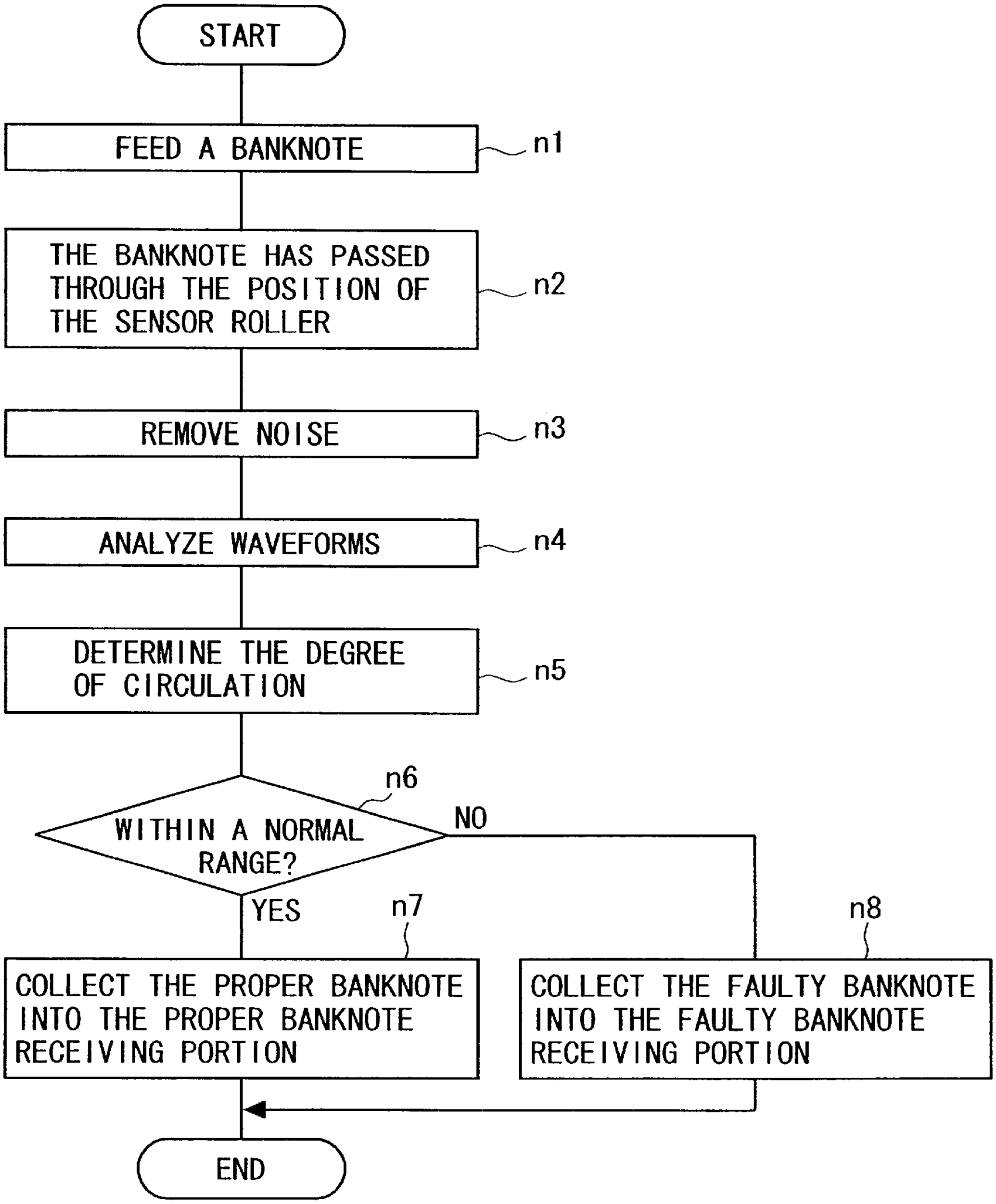
FIG. 7 is a flowchart showing a determination processing operation of the paper quality determination sensor according to the present invention.
Figure 8:
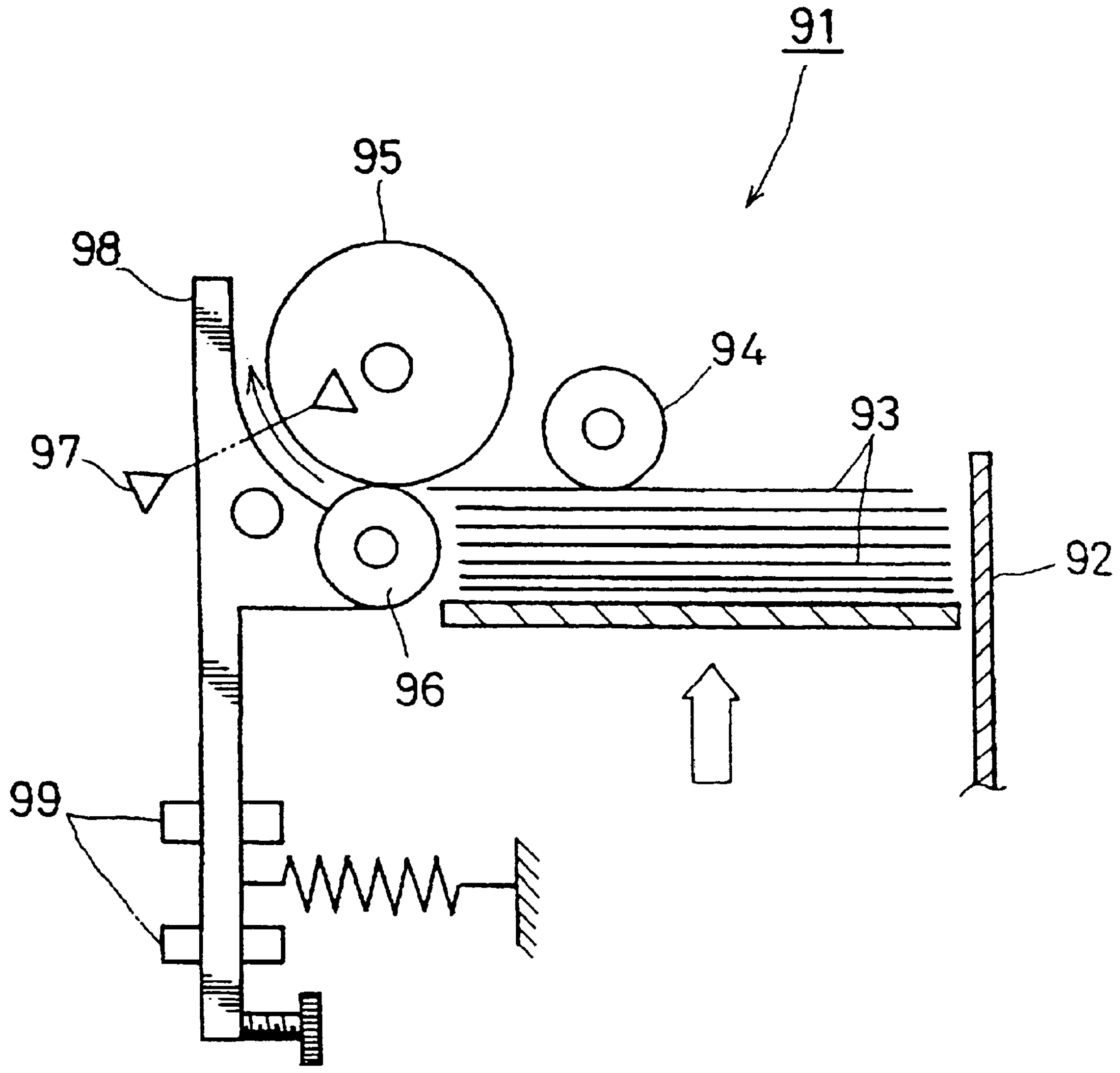
FIG. 8 is a side view showing a main part of a prior art direct-type detecting device for directly detecting a stiffness of a banknote.
Figure 9:
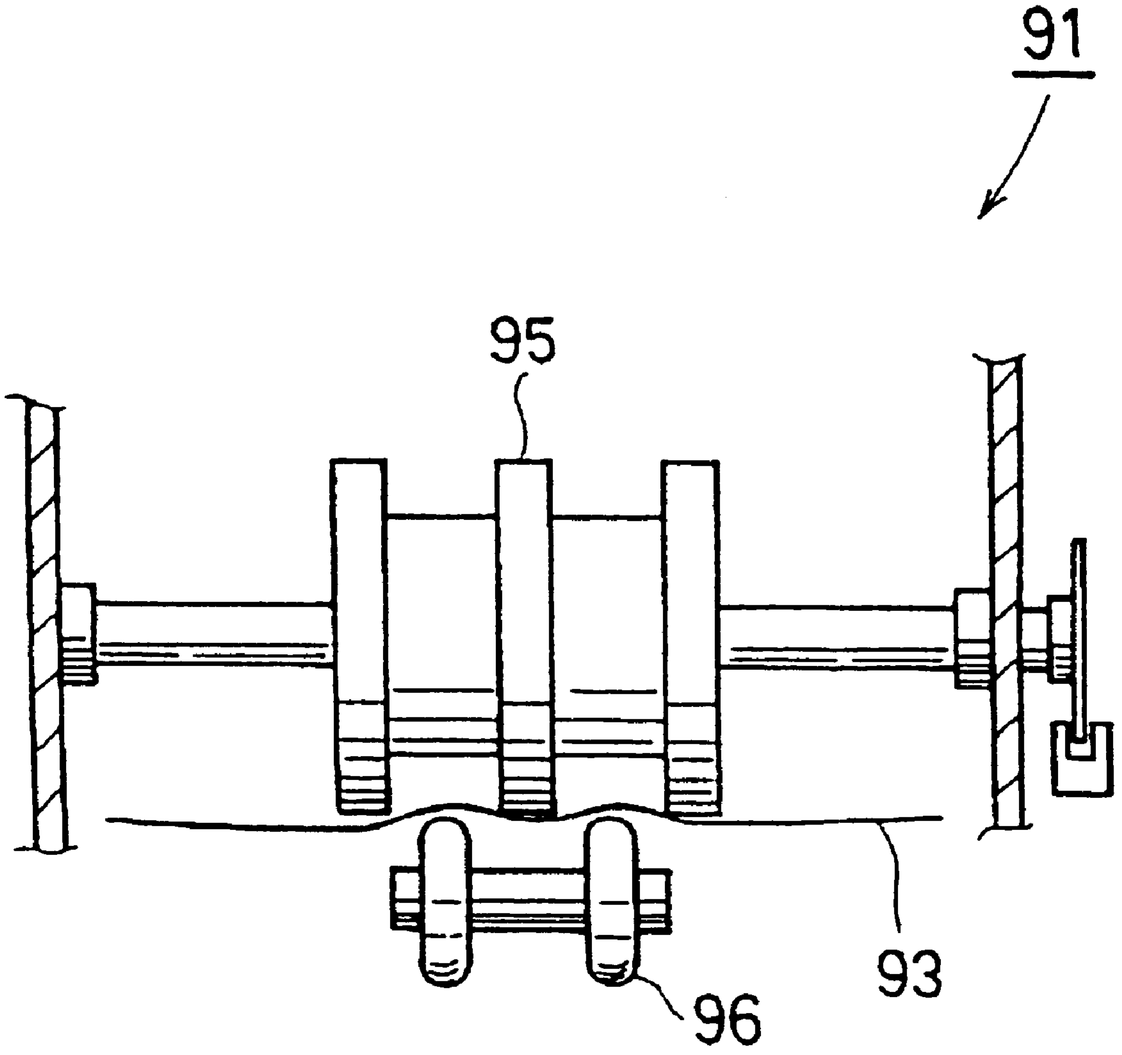
FIG. 9 is a front view showing the main part of the prior art direct-type detecting device for directly detecting the stiffness of the banknote.

FIG. 7 shows a flowchart showing the overall process of a banknote using the paper quality determination unit 11 according to the present embodiment.

First, when a banknote 12 is carried along the hold carrying path 13 and is then led to a position where the paper quality determination unit 11 is disposed (Step n1), the sensor roller 16 of the paper quality determination unit 11 confronts and contacts the banknote 12 which is hold carried oblongly in a state in which the sensor roller 16 lightly presses against a central portion of the flat surface of the banknote 12.

When this occurs, the sensor roller 16 receives a reaction force inherent in the banknote itself which is placed under a certain tensile force by the carrying rollers 15 and the reference rollers 14 (the rubber rollers 19) and is then displaced so as to be pushed back toward the unit frame 17 (toward the upper portion of FIG. 1). The displacement amount of the sensor roller 16 at that time is measured by the strain gauge 23 (Step n2).

At this time, noise is removed from the measured value obtained by the strain gauge 23, and as is described in FIGS. 10 to 17, the measured value free of noise is then analyzed with respect to output waveforms to thereby obtain the degree of circulation (refer to FIG. 6) of the banknote 12 (Steps n3 to n5).

The CPU 51 determines from the obtained degree of circulation whether the banknote 12 in question is a proper banknote or a faulty banknote. Here, in the event that the banknote 12 is determined as a proper one, since the banknote can still be used in the marketplace, the banknote is allowed to be carried to the proper banknote stacker 47 (Steps n6 to n7), and on the contrary, in the event that the banknote is determined as a faulty one, since it is improper for circulation, the banknote is carried to the faulty banknote receiving box 49 (Step n8).

As has been described above, in determination of the paper quality of a banknote 12, the sensor roller 16 is brought into press contact with the carrying surface of the banknote 12 which is being carried along the hold carrying path 13, and the strain gauge 23 measures the deformed reaction force of the banknote 12 based on the displaced amount of the sensor roller 16 which is displaced by virtue of the reaction force, whereby the paper quality of the banknote 12 is determined. In addition, the carrying rollers 15 themselves are maintained at the reference positions corresponding to the thickness of the banknote 12 by means of the press spring 21.

Consequently, according to this embodiment, the stiffness of the banknote 12 can be obtained by accurately detecting the paper quality reaction force inherent in the banknote itself, irrespective of the thickness of the banknote 12.

Owing to this, it is possible to inspect banknotes having low stiffness for the thickness thereof together with other banknotes in a continuous fashion.

Additionally, in the event that this paper quality determination sensor is incorporated in a faulty banknote sorting device, proper banknotes and faulty banknotes can be clearly sorted out by this paper quality determination sensor, whereby a highly reliable sorting capability can be provided. Consequently, the sensor can be applied to a banknote processing device such as an ATM, in which case only banknotes improper for re-circulation are collected efficiently to thereby prevent the occurrence of jamming.

(Second Embodiment)

Figure 19:
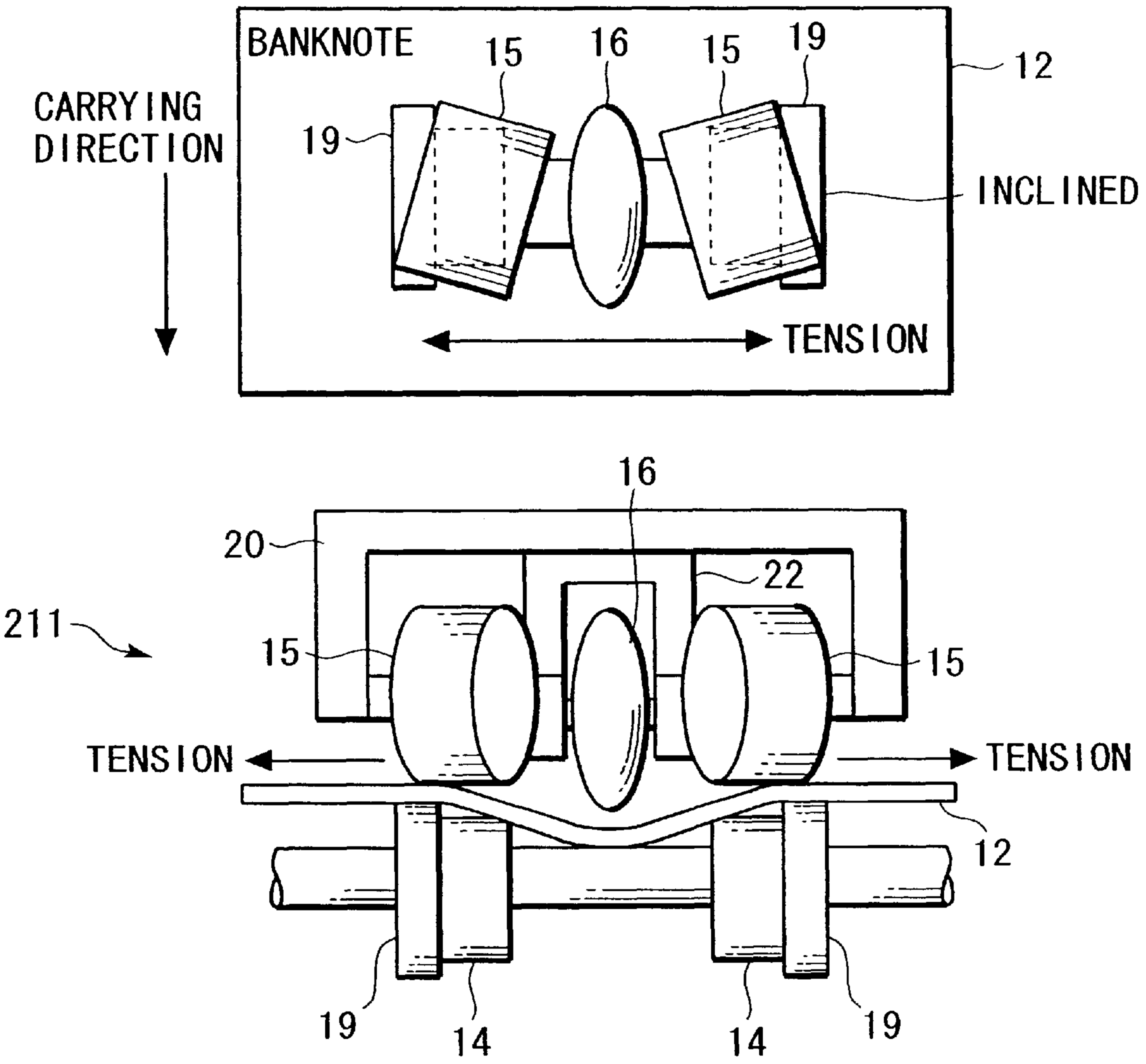
FIG. 19 is a front view of a paper quality determination unit according to a second embodiment of the present invention.

An upper part of FIG. 19 shows a plan view of a paper quality determination unit 211 according to another embodiment of the present invention, and a lower part shows a front view of the embodiment.

The paper quality determination unit 211 according to the second embodiment of the present invention is substantially similar to that described in the first embodiment in FIG. 1 in construction except for where the carrying rollers 15 are disposed. Namely, as shown in FIG. 19, a pair of carrying rollers 15 are attached to a carrying roller holder 20 at their axial positions in such a manner that the rollers are expanded wider at the front in a direction in which banknotes 12 are fed. The other components such as a sensor roller 16, a sensor lever 22, and reference rollers 14 are identical in construction to those described in the first embodiment (FIG. 1), and therefore, a description thereof will be omitted.

In the second embodiment, since the pair of carrying rollers 15 are rotatably supported in such a manner that the carrying rollers 15 are expanded from each other at the front in the direction in which banknotes are fed, when a banknote 12 is carried along a hold carrying path 13 to pass through the carrying rollers 15, a certain tension is applied to the surface of the banknote 12 perpendicularly relative to the carrying direction of the banknote 12, as a result of which the banknote 12 is maintained tensioned constantly.

Due to this, even in the event that a banknote 12 which has a V-shaped fold is deposited, since the tension is applied to the plane of the banknote 12 in the width direction relative to the direction in which the banknote is carried, the deformation due to the formed fold is corrected, whereby the reaction force inherent in the banknote 12 itself can be detected highly accurately.

In addition, according to the second embodiment, since the tension is generated on the surface of the banknote 12 by the carrying rollers 15 disposed as described above, no biasing means such as a pressing spring is needed, or only a biasing means having a small biasing force is needed.

(Third Embodiment)

Figure 20:
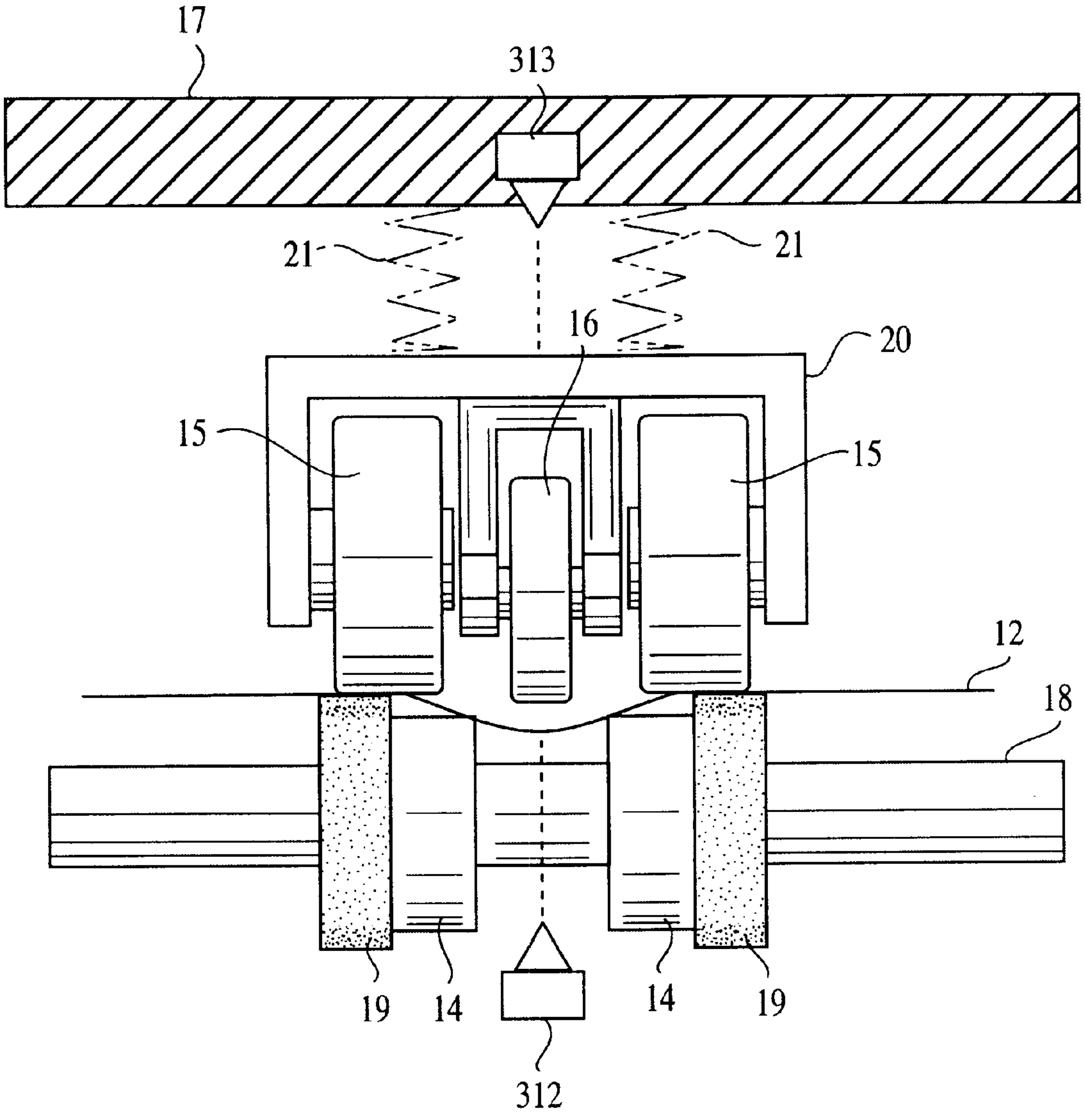
FIG. 20 is a front view of a paper quality determination unit according to a third embodiment of the present invention.

FIG. 20 shows a front view showing a paper quality determination unit 311 according to a further embodiment of the present invention.

In a paper quality determination unit 311 according to a third embodiment of the present invention, displacement sensors 313 and 312 are provided, respectively, below a unit frame 17 and a sensor roller 16. A known non-contact optical laser displacement sensor may be used as the displacement sensor 312, and with this sensor a distance can be measured using a wavelength of a reflected light from an object in question.

With the third embodiment, the displacement amount of a banknote 12 can be measured more highly accurately with the optical displacement sensor 312 than with the strain gauge 23 to which physical noise components are involved. In addition, a displacement sensor 312 like this may be used together with the strain gauge 23 described in the first embodiment with a view to performing a higher accurate measurement.

Furthermore, a deformation amount of the banknote 12 such as a fold formed therein can be detected by detecting the displacement amount of a banknote 12 held by the carrying rollers 15 and the reference rollers 14 (rubber roller 19).

On the other hand, the vertical displacement amount of the carrying roller holder 20 can be measured by attaching also an optical displacement sensor 313 to the unit frame 17. Therefore, the thickness of the banknote 12 can be detected.

Figure 21:
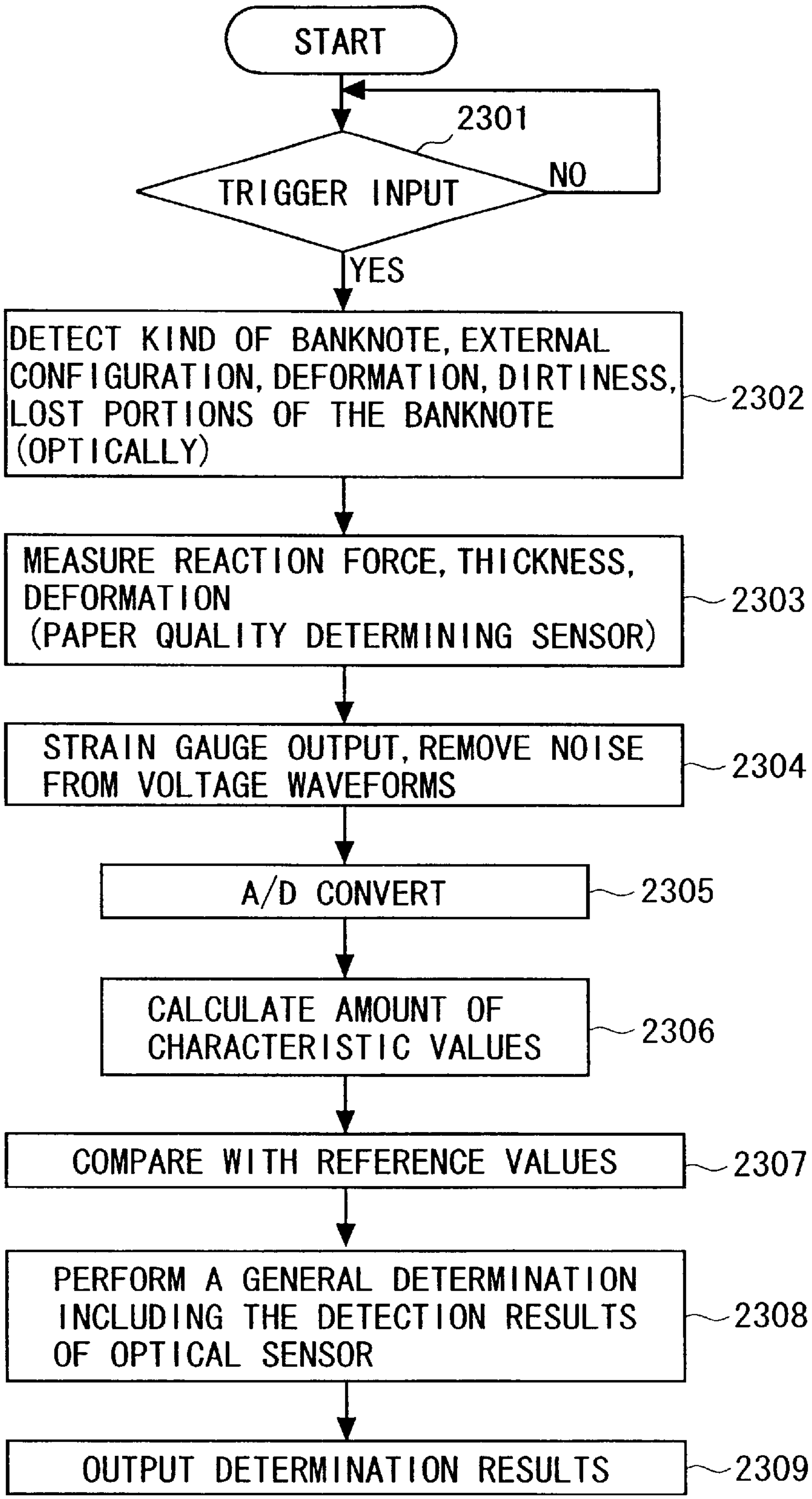
FIG. 21 is a flowchart showing a process according to the third embodiment of the present invention.

FIG. 21 shows a flowchart showing the process according to the present embodiment. The process will be described below.

First, when a banknote 12 is deposited from a deposit port 42, the banknote 12 is carried along a carrying path 223 and the deposit of the banknote 12 is detected by a trigger sensor 222 (Step 2301). The banknote is detected by a banknote identification portion 44 using an optical sensor, not shown, with respect to the kind of the banknote, the external configuration thereof and the existence of deformation, dirty portions and lost portions (2302).

Next, with a paper quality determination sensor which is also not shown, the reaction force, thickness and displacement amount of the banknote 12 are measured (2303). The detection to be carried out in this step 2303 may be performed with the displacement sensors 313 and 312 described in FIG. 20.

Next, noise components are removed from voltage waveforms outputted from the strain gauge 23 (2304), and the results are then A/D converted so as to be read into the CPU 51. Characteristic values (h, t, a) as described in the first embodiment are calculated from the signals so digitized (2306). Then, comparisons with the reference values as also described in the first embodiment are carried out (2307), and furthermore, general determinations including the detection results of the displacement sensors 312, 313 or the like are carried out (2308), whereby whether the banknote is proper or faulty is determined (2309).

Here, the paper quality determination performance can further be improved through feedback to the paper quality determination result of not only changes in voltage outputted from the strain gauge 23 but also the results of identification of the kind of banknote and the external configuration, deformation and lost portions thereof by the light sensor of displacement sensors 312, 313 or the like. For example, as described with respect to FIG. 14, with a banknote 12 having a hole opening at a portion thereof, there is causes a portion where the output voltage from the strain gauge 23 drastically drops, and a risk results in which the rigidity is determined as low, but a further accurate rigidity detection can be performed by correcting the outputted rigidity result based on information on the position of the hole from the optical sensor.

While banknotes 12 are used as paper sheets in the embodiments of the present invention, an object to be inspected may by paper sheets other than banknotes, and any of films, tapes, magnetic cards, tickets, cloths, and metallic sheets.

Note that since the output of the strain gauge can be calibrated with a basic medium whose rigidity is not changed by temperature and/or humidity or the like, an absolute value comparison is possible. Therefore, the present invention may be used not only as the sorting device of faulty banknotes but also as a bending elastic modulus measuring device for a basic medium. In other words, the bending elastic modulus of the basic medium can be measured by a currently existing measuring method, and therefore, an output from the strain gauge can be converted into a bending elastic modulus based on it.

Here, assuming that the width of the medium obtained from the optical sensor is b, the thickness of the medium obtained from the paper quality determination sensor is a, and a reaction force is F, the bending elastic modulus can be obtained from the following linear expression using a proportionality factor K:

$$E=KF/I, \text{ where } I=ba^3/12 \qquad \text{(Expression 1)}$$

Since the bending elastic modulus can be generally used as a characteristic independent from the configuration, it can be used as a characteristic value of the rigidity of a medium, an inspection value during a banknote production process and a value indicating the condition of an inspection banknote for use at banknote processing apparatus manufacturing plants.

Although not described herein, the present invention may be used for determination on whether paper sheets can be used on a color copier or color printer or the like since there are many types of paper sheets for use on OA apparatus which have different rigidities with the same thickness.

Furthermore, the rigidity of paper is one of the inspection items for paper at paper production plants, and if the paper quality determination of the present invention is used for inspection thereof, an on-line measurement is possible, whereby it is possible to improve the accuracy in quality control and reduce man hours.

Note that the "paper quality" is used as a term to mean a characteristic relating to the rigidity of paper sheets in the present invention. Namely, the term means characteristics such as those related to a problem of the possibility of causing jamming along the carrying path by reduction in stiffness resulting from the degree of circulation, and the existence of twist, formed fold, breakage and lost portions or the like.

Furthermore, while banknotes are used for description of paper sheets as an example, as described above, paper sheets include conception of films, tapes and thin plate-like cards.

Industrial Applicability

The present invention may be used for an atm with a paper quality determination function, a processing device or collecting device for films, tapes, magnetic cards or the like, a copier needing to check the quality of paper sheets, a printer, and a bending elastic modulus measuring device for paper sheets.

What is claimed is:

1. A paper quality determination sensor, comprising:

at least a pair of reference rollers spaced at given intervals along an axial direction of said reference rollers, said reference rollers also being positioned on one side of a paper sheet carrying path for supporting paper sheets;

a pair of carrying rollers spaced along an axial direction of said carrying rollers, said carrying rollers being provided on the other side of the paper sheet carrying path, for holding the paper sheets together with the reference rollers sandwichingly in at least two positions; and detecting means for detecting reaction forces of the paper sheets sandwichingly held at the two positions.

2. A paper quality determination sensor as set forth in claim 1, further comprising paper sheet deformation detecting means for detecting deformed condition of the paper sheets in a non-contact manner.

3. A paper quality determination sensor comprising:

at least a pair of reference rollers provided at given intervals on one side of a carrying path for paper sheets for supporting the paper sheets;

a pair of carrying rollers provided on the other side of the carrying path, for holding the paper sheets together with the pair of reference rollers sandwichingly in at least two positions; and detecting means for detecting reaction forces of the paper sheets sandwichingly held at the two positions, wherein the carrying rollers are fixed to a carrying roller holder at their rotating shafts, and wherein the carrying roller holder has a sensor roller for imparting a biasing force to the paper sheets, which is supported by a supporting body that can be displaced by virtue of the reaction forces from the paper sheets, and the detecting means is provided to the supporting body.

4. A paper quality determination sensor comprising:

at least a pair of reference rollers provided at given intervals on one side of a carrying path for paper sheets for supporting the paper sheets;

a pair of carrying rollers provided on the other side of the carrying path, for holding the paper sheets together with the pair of reference rollers sandwichingly in at least two positions; and detecting means for detecting reaction forces of the paper sheets sandwichingly held at the two positions, wherein the carrying rollers are fixed to a carrying roller holder at their rotating shafts, and wherein the carrying roller holder has a sensor roller for imparting a biasing force to the paper sheets, which is supported by a supporting body that can be displaced by virtue of the reaction forces from the paper sheets, and the detecting means is provided to the supporting body and wherein the carrying roller holder is provided with pressing means for generating a sandwiching force for holding the paper sheets toward a direction of the reference rollers.

5. A paper quality determination sensor comprising:

at least a pair of reference rollers provided at given intervals on one side of a carrying path for paper sheets for supporting the paper sheets;

a pair of carrying rollers provided on the other side of the carrying path, for holding the paper sheets together with the pair of reference rollers sandwichingly in at least two positions; and detecting means for detecting reaction forces of the paper sheets sandwichingly held at the two positions, wherein the pair of reference rollers or the pair of carrying rollers are disposed so as to be spread from each other toward a front direction along which the paper sheets are carried, for generating a tension in a width direction thereof as the paper sheets travel.

6. A paper quality determination sensor comprising:

at least a pair of reference rollers provided at given intervals on one side of a carrying path for paper sheets for supporting the paper sheets;

a pair of carrying rollers provided on the other side of the carrying path, for holding the paper sheets together with the pair of reference rollers sandwichingly in at least two positions;

detecting means for detecting reaction forces of the paper sheets sandwichingly held at the two positions, wherein the carrying rollers are fixed to a carrying roller holder at their rotating shafts, and wherein the carrying roller holder has a sensor roller for imparting a biasing force to the paper sheets, which is supported by a supporting body that can be displaced by virtue of the reaction forces from the paper sheets, and the detecting means is provided to the supporting body; and roller holder displacement detecting means for detecting the displacement amount of the carrying roller holder, which is displaced based on the thickness of the paper sheets.

7. A paper quality determination method, comprising the steps of:

detecting a change in reaction forces of paper sheets and storing an amount of displacement at a specific point of time;

determining a degree of rigidity of the paper sheets by comparing the displacement amount with a pre-stored reference value; and determining whether the paper sheets are proper banknotes or improper banknotes, based on the degree of rigidity.

8. A paper quality determination method, comprising the steps of:

detecting a change in reaction forces of paper sheets with time and storing a time during which a pre-set threshold value is exceeded within a given period of time or a number of times that the threshold value is passed up and down; and comparing the time and the number of times with preset-stored time to thereby detect abnormal positions of the paper sheets.

9. A paper quality determination method, comprising the steps of:

detecting a change in reaction forces of paper sheets with time;

storing an amplitude indicative of the condition of the paper sheets; and comparing the stored amplitude with pre-stored reference values to detect the deformed condition of the paper sheets.

10. A paper quality determination method, comprising the steps of:

detecting reaction forces of paper sheets;

detecting physical deformation amounts of the paper sheets;

detecting thicknesses of the paper sheets;

determining at least one of the external configuration, and the identity of the kind of the paper sheets; and determining conditions of the paper sheets from the reaction forces, the deformed amounts and the thicknesses of the paper sheets, based on the at least one of said external configuration and identity of the kind of the paper sheets.

* * * * *

UNITED STATES PATENT AND TRADEMARK OFFICE

CERTIFICATE OF CORRECTION

PATENT NO. : 6,574,569 B1

DATED : June 3, 2003

INVENTOR(S) : Nobuaki Omata et al.

It is certified that error appears in the above-identified patent and that said Letters Patent is hereby corrected as shown below:

Title page,

Item [86], PCT No. "PCT/JP99/01570" should be -- PCT/JP99/01578 --.

Signed and Sealed this

Ninth Day of December, 2003

JAMES E. ROGAN

*Director of the United States Patent and Trademark Office*